(12) United States Patent
Pang et al.

(10) Patent No.: US 10,200,713 B2
(45) Date of Patent: Feb. 5, 2019

(54) SEARCH REGION DETERMINATION FOR INTER CODING WITHIN A PARTICULAR PICTURE OF VIDEO DATA

(71) Applicant: QUALCOMM Incorporated, San Diego, CA (US)

(72) Inventors: Chao Pang, Marina del Ray, CA (US); Krishnakanth Rapaka, San Diego, CA (US); Vadim Seregin, San Diego, CA (US); Marta Karczewicz, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 15/151,416

(22) Filed: May 10, 2016

(65) Prior Publication Data
US 2016/0337661 A1 Nov. 17, 2016

Related U.S. Application Data

(60) Provisional application No. 62/159,839, filed on May 11, 2015, provisional application No. 62/173,248, (Continued)

(51) Int. Cl.
*H04N 19/52* (2014.01)
*H04N 19/523* (2014.01)
(Continued)

(52) U.S. Cl.
CPC ........... *H04N 19/52* (2014.11); *H04N 19/105* (2014.11); *H04N 19/182* (2014.11);
(Continued)

(58) Field of Classification Search
CPC ...... H04N 19/105; H04N 19/52; H04N 19/61; H04N 19/182; H04N 19/186; H04N 19/57
See application file for complete search history.

(56) References Cited

U.S. PATENT DOCUMENTS 7,742,524 B2 6/2010 Jeon et al.
9,485,515 B2 11/2016 Xu et al.
(Continued)

FOREIGN PATENT DOCUMENTS

EP 2491718 A1 8/2012
WO 2016138854 A1 9/2016

OTHER PUBLICATIONS

Response to Written Opinion dated Jul. 27, 2016, from international application No. PCT/US2016/031888, filed Mar. 1, 2017, 6 pp.
(Continued)

*Primary Examiner* — Behrooz M Senfi
(74) *Attorney, Agent, or Firm* — Shumaker & Sieffert, P.A.

(57) ABSTRACT

An example method of encoding video data includes determining a resolution that will be used for a motion vector that identifies a predictor block in a current picture of video data for a current block in the current picture of video data; determining, based on the determined resolution, a search region for the current block such that a size of the search region is smaller where the resolution is fractional-pixel than where the resolution is integer-pixel; selecting, from within the search region, a predictor block for the current block; determining the motion vector that identifies the selected predictor block for the current block; and encoding, in a coded video bitstream, a representation of the motion vector.

30 Claims, 14 Drawing Sheets

Related U.S. Application Data filed on Jun. 9, 2015, provisional application No. 62/175,179, filed on Jun. 12, 2015.

(51) Int. Cl.
- H04N 19/57 (2014.01)
- H04N 19/105 (2014.01)
- H04N 19/182 (2014.01)
- H04N 19/61 (2014.01)
- H04N 19/593 (2014.01)
- H04N 19/503 (2014.01)
- H04N 19/186 (2014.01)

(52) U.S. Cl.
CPC ........... H04N 19/523 (2014.11); H04N 19/57 (2014.11); H04N 19/593 (2014.11); H04N 19/61 (2014.11); H04N 19/186 (2014.11); H04N 19/503 (2014.11)

(56) References Cited

U.S. PATENT DOCUMENTS

| | | | |
|---|---|---|---|
| 9,749,642 | B2 | 8/2017 | Sullivan et al. |
| 2003/0202588 | A1 | 10/2003 | Yu et al. |
| 2013/0251024 | A1* | 9/2013 | Li .................. H04N 19/56 375/240.02 |
| 2014/0376634 | A1 | 12/2014 | Guo et al. |
| 2015/0055703 | A1 | 2/2015 | Pang et al. |
| 2015/0071357 | A1 | 3/2015 | Pang et al. |
| 2015/0195562 | A1 | 7/2015 | Li et al. |
| 2016/0105682 | A1* | 4/2016 | Rapaka .............. H04N 19/44 375/240.12 |
| 2016/0337662 | A1 | 11/2016 | Pang et al. |
| 2017/0094272 | A1* | 3/2017 | Rusanovskyy ...... H04N 19/523 |
| 2017/0295370 | A1 | 10/2017 | Xu et al. |

OTHER PUBLICATIONS

Second Written Opinion of International Application No. PCT/US2016/031888, dated Apr. 12, 2017, 6 pp.

International Preliminary Report on Patentability from International Application No. PCT/US2016/031888, dated Jul. 12, 2017, 8 pp.

Li B., et al., "Adaptive Motion Vector Resolution for Screen Content", 19th Meeting, Oct. 17-24, 2014, Strasbourg, FR; (Joint Collaborative Team on Video Coding of ITU-T SG 16 WP3 and ISO/IEC JTC1/SC29WG11), JCTVC-S0085_powerpoint, Oct. 16, 2014, 6 Pages.

Boyce, et al., "Edition 2 Draft Text of High Efficiency Video Coding (HEVC), Including Format Range (RExt), Scalability (SHVC), and Multi-View (MV-HEVC) Extensions", JCT-VC Meeting; Jun. 30-Jul. 9, 2014; Sapporo, JP; (Joint Collaborative Team on Video Coding of ISO/IEC JTC1/SC29/WG11 and ITU-T SG.16 ); URL: http://wftp3.1tu.int/av-arch/jctvc-sitei, No. JCTVC-R1013-v4, Aug. 13, 2014 , XP030116700, 384 pp.

International Search Report and Written Opinion from International Application No. PCT/US2016/031888 , dated Jul. 27, 2016, 12 pp.

Joshi et al., "Screen content coding test model 2 (SCM 2)", JCT-VC Meeting, Mar. 27-Apr. 4, 2014, Valencia, ES; (Joint Collaborative Team on Video Coding (JCT-VC) of ITU-T SG 16 WP 3 and ISO/IEC JTC 1/SC 29/WG 11); URL: htip://wftp3.1tu.int/av-arch/jctvc-site/, No. JCTVC-R1014, Oct. 17, 2014, 10 pp.

Li, et al., °Non -SCCE1: Unification of Intra BC and Inter Modes, JCT -VC Meeting; Jun. 30-Jul. 9, 2014; Sapporo, JP; (Joint Collaborative Team on Video Coding of ISO/IEC JTC1/SC29/WG11 and ITU -T SG.16 ); URL: http://wftp3.itu.int/av-arch/jctvc-site/, No. JCTVC -R0100-v2, Jun. 29, 2014, XP030116357, 28 pp.

McCann, et al., "High Efficiency Video Coding (HEVC) Test Model 16 (HM 16) Encoder Description," JCT-VC Meeting; Jun. 30-Jul. 9, 2014; Sapporo, JP; (Joint Collaborative Team on Video Coding of ISO/IEC JTC1/SC29/WG11 and ITU-T SG.16); URL: http://wftp3.itu.int/av-arch/jctvc-site/, No. JCTVC-R1002, Oct. 14, 2014, XP030116689; 60 pp.

Pang, et al., "Non-CE2: Intra Block Copy and Inter Signaling Unification", JCT-VC Meeting, Feb. 10-18, 2015, Geneva,CH; (Joint Collaborative Team on Video Coding of ISO/IEC JTC1/SC29/WG11 and ITU-T SG.16), URL: http://wftp3.1tu.int/av-arch/jctvc-site/, No. JCTVC-T0227, Feb. 15, 2015, XP030117398, 3 pp.

Rapaka, et al., "On Unification of Adapative Motion Vector Resolution", JCT-VC Meeting, Jun. 19-26, 2015, Warsaw,PL; (Joint Collaborative Team on Video Coding of ISO/IEC JTC1/SC29/WG11 and ITU-T SG.16), URL: http://wftp3.1tu.int/av-arch/jctvc-site/, No. JCTVC-U0081, Jun. 10, 2015, XP030117506, 4 pp.

Xu, et al., "On Stored Decoded Motion Vector Resolution", JCT-VC Meeting, Jun. 19-26, 2015, Warsaw,PL; (Joint Collaborative Team on Video Coding of ISO/IEC JTC1/SC29/WG11 and ITU-T SG.16), Url: http://wftp3.itu.int/av-arch/jctvc-site/, No. JCTVC-U0107, Jun. 10, 2015, XP030117542, 7 pp.

Zhang, et al., "On Adaptive Motion Vector Resolution", JCT-VC Meeting, Feb. 10-18, 2015, Geneva,CH; (Joint Collaborative Team on Video Coding of ISO/IEC JTC1/SC29/WG11 and ITU-T SG.16), URL: http://wftp3.itu.int/av-arch/jctvc-site/, No. JCTVC-T0059, Jan. 30, 2015 , XP030117180, 3 pp.

Zhang, et al., "On Adaptive Motion Vector Resolution, JCTVC-T0059—Presentation Slides", JCT-VC Meeting, Feb. 10-18, 2015, Geneva,CH; (Joint Collaborative Team on Video Coding of ISO/IEC JTC1/SC29/WG11 and ITU-T SG.16), URL: http://wftp3.itu.int/av-arch/jctvc-site/, No. JCTVC-T0059 Powerpoint presentation, Feb. 14, 2015 , 10 pp.

Balle, et al., "Extended Texture Pediction for H.264/AVC Intra Coding", VCEG Meeting; MPEG Meeting; Jan. 15-16, 2007; Marrakech; (Video Coding Experts Group of ITU-T SG.16), No. VCEG-AE11, XP030003514, ISSN: 0000-0157, Jan. 13, 2007, 7 pp.

Budagavi et al., "AHG8: Video coding using Intra motion compensation", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0350, XP030114307, Apr. 9, 2013, 3 pp.

Pang, et al., "Non-RCE3: Intra Motion Compensation with 2-D MVs", JCT-VC Meeting; Jul. 25-Aug. 2, 2013; Vienna; (Joint Collaborative Team on Video Coding of ISO/IEC JTC1/SC29/WG11 and ITU-TSG . 16) ; URL : http://wftp3.itu.int/av-arch/jctvc-site/, No. JCTVC-N0256-v4, XP030114777, Jul. 26, 2013, 12 pp.

Pang, et al., "AhG5: Intra block copying with padding", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-00157-vS, Oct. 24, 2013, 6 pp.

Iwata, et al., "Intra texture prediction based on repetitive pixel replenishment", Image Processing (ICIP), 2012 19th IEEE International Conference on, IEEE, Sep. 30, 2012 , pp. 2933-2936, XP032333810, DOI: 10.1109/ICIP.2012.6467514, ISBN: 978-1-4673-2534-9.

Ling, et al., "Adaptive Intra Prediction Padding to Improve Intra Motion Compensation", Picture Coding Symposium; Beijing, Apr. 24, 2006, XP030080231, 4 pp.

Pang, et al., "AhG5: Fast encoder search and search region restriction for intra block copying", JCT-VC Meeting; Oct. 23-Nov. 1, 2013; Geneva, CH; (Joint Collaborative Team on Video Coding of ISO/IEC JTC1/SC29/WG11 and ITU-T SG.16 ); URL: http://wftp3.itu.int/av-arch/jctvc-site/, No. JCTVC-00156-v3, XP030115177, Oct. 18, 2013, 5 pp.

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Flynn, et al., "High Efficiency Video Coding (HEVC) Range Extensions text specification: Draft 7", 17th JCT-VC Meeting; Mar. 27-Apr. 4, 2014; Vienna; (Joint Collaborative Team on Video Coding of ISO/IEC JTC1/SC29/WG11 and ITU-T SG.16); URL: http://wftp3.1tu.int/av-arch/jctvc-site/, No. JCTVC-Q1005-v4, Apr. 10, 2014, 376 pp.

Wang et al., "High Efficiency Video Coding (HEVC) Defect Report 2", 15th Meeting, Oct. 23-Nov. 1, 2013, Geneva, CH; (Joint Collaborative Team on Video Coding of ITU-T SG 16 WP 3 and ISO/IEC JTC1/SC29/WG11) URL: http://wftp3.1tu.int/av-arch/jctvc-site/, No. JCTVC-O1003-v2, Nov. 24, 2013, 311 pp.

Joshi et al., "High Efficiency Video Coding (HEVC) Screen Content Coding: Draft 3", 20th Meeting, Feb. 10-17, 2015, Geneva, CH (Joint Collaborative Team on Video Coding of ITU-T SG 16 WP 3 and ISO/IEC JTC1/SC29/WG11) URL: http://wftp3.1tu.int/av-arch/jctvc-site/, No. JCTVC-T1005-v2, Apr. 5, 2015, 565 pp.

"Joint Call for Proposals for Coding of Screen Content," (Visual Coding group of ITU-T Q6/16 and ISO/IEC/JTC1/SC29/WG11) presented in the Jan. 17, 2014 meeting, San Jose, California. URL: http://www.itu.int/en/ITU-T/studygroups/com16/video/Documents/CfP-HEVC-coding-screen-content.pdf. 15 pp.

Yu et al., "New Intro Prediction using Intra-Macroblock Motion Compensation", 3rd Meeting, May 6-10, 2002,Fairfax, Virginia, (Joint Video Team (JVT) of ISO/IEC MPEG & ITU-T VCEG (ISO/IEC JTC1/SC29/WG11 and ITU-T SG16 Q.6)), No. JVT-C151.r1, Jan. 17, 2005, 10 pp.

Rapaka et al., "On parallel processing capability of intra block copy", 19th Meeting, Oct. 17-24, 2014, Strasbourg, FR; (Joint Collaborative Team on Video Coding of ITU-T SG 16 WP 3 and ISO/IEC JTC1/SC29/WG11), JCTVC-S0220, Oct. 10, 2014, 5 pp.

Li et al., "Adaptive motion vector resolution for screen content", 19th Meeting, Oct. 17-24, 2014, Strasbourg, FR; (Joint Collaborative Team on Video Coding of ITU-T SG 16 WP 3 and ISO/IEC JTC1/SC29/WG11), JCTVC-50085, Oct. 7, 2014, 11 pp.

Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.

Wang et al., "High Efficiency Video Coding (HEVC) Defect Report", 17th Meeting, Mar. 27-Apr. 4, 2014, Valencia, ES; (Joint Collaborative Team on Video Coding of ITU-T SG 16 WP 3 and ISO/IEC JTC1/SC29/WG11), JCTVC-Q1003(v.1), May 28, 2014, 314 pp.

Joshi et al., "High Efficiency Video Coding (HEVC) Screen Content Coding: Draft 6", 23rd Meeting, Feb. 19-26, 2016, San Diego, USA; (Joint Collaborative Team on Video Coding of ITU-T SG 16 WP 3 and ISO/IEC JTC1/SC29/WG11), JCTVc-W1005-v1, Mar. 24, 2016, 697 pp.

Li et al., "Adaptive motion vector resolution for screen content", 19th Meeting, Oct. 17-24, 2014, Strasbourg, FR; (Joint Collaborative Team on Video Coding of ITU-T SG 16 WP 3 and ISO/IEC JTC1/SC29/WG11), JCTVC-S0085_r1, Oct. 16, 2014, 14 pp.

Li et al., "Adaptive motion vector resolution for screen content", 19th Meeting, Oct. 17-24, 2014, Strasbourg, FR; (Joint Collaborative Team on Video Coding of ITU-T SG 16 WP 3 and ISO/IEC JTC1/SC29/WG11), JCTVC-50085_powerpoint, Oct. 16, 2014, 6 pp.

Joshi et al., "High Efficiency Video Coding (HEVC) Screen Content Coding: Draft 5", 22nd Meeting, Oct. 15-21, 2015, Geneva, CH; (Joint Collaborative Team on Video Coding of ITU-T SG 16 WP 3 and SO/IEC JTC1/SC29/WG11), JCTVC-V1005, Jan. 31, 2016, 694 pp.

Rapaka et al., "On Chroma MV derivation for intra block copy for non-444", 21st Meeting, Jun. 19-26, 2015, Warsaw, PL; (Joint Collaborative Team on Video Coding of ITU-T SG 16 WP 3 and ISO/IEC JTC1/SC29/WG11), JCTVC-U0080_r1, Oct. 27, 2015, 3 pp.

Rapaka, "BoG report on worst case memory bandwidth assessment," 21st Meeting, Jun. 19-26, 2015, Warsaw, PL; (Joint Collaborative Team on Video Coding of ITU-T SG 16 WP 3 and ISO/IEC JTC1/SC29/WG11), JCTVC-U0175_r1, Nov. 29, 2015, 7 pp.

Sullivan, et al. Meeting report of the 21st meeting of the Joint Collaborative Team on Video Coding (JCT-VC), Narsaw, PL, 21st Meeting, Jun. 19-26, 2015, Warsaw, PL; (Joint Collaborative Team on Video Coding of ITU-T SG 16 WP 3 and ISO/IEC JTC1/SC29/WG11), JCTVC-U1000, Nov. 29, 2015, 127 pp.

* cited by examiner

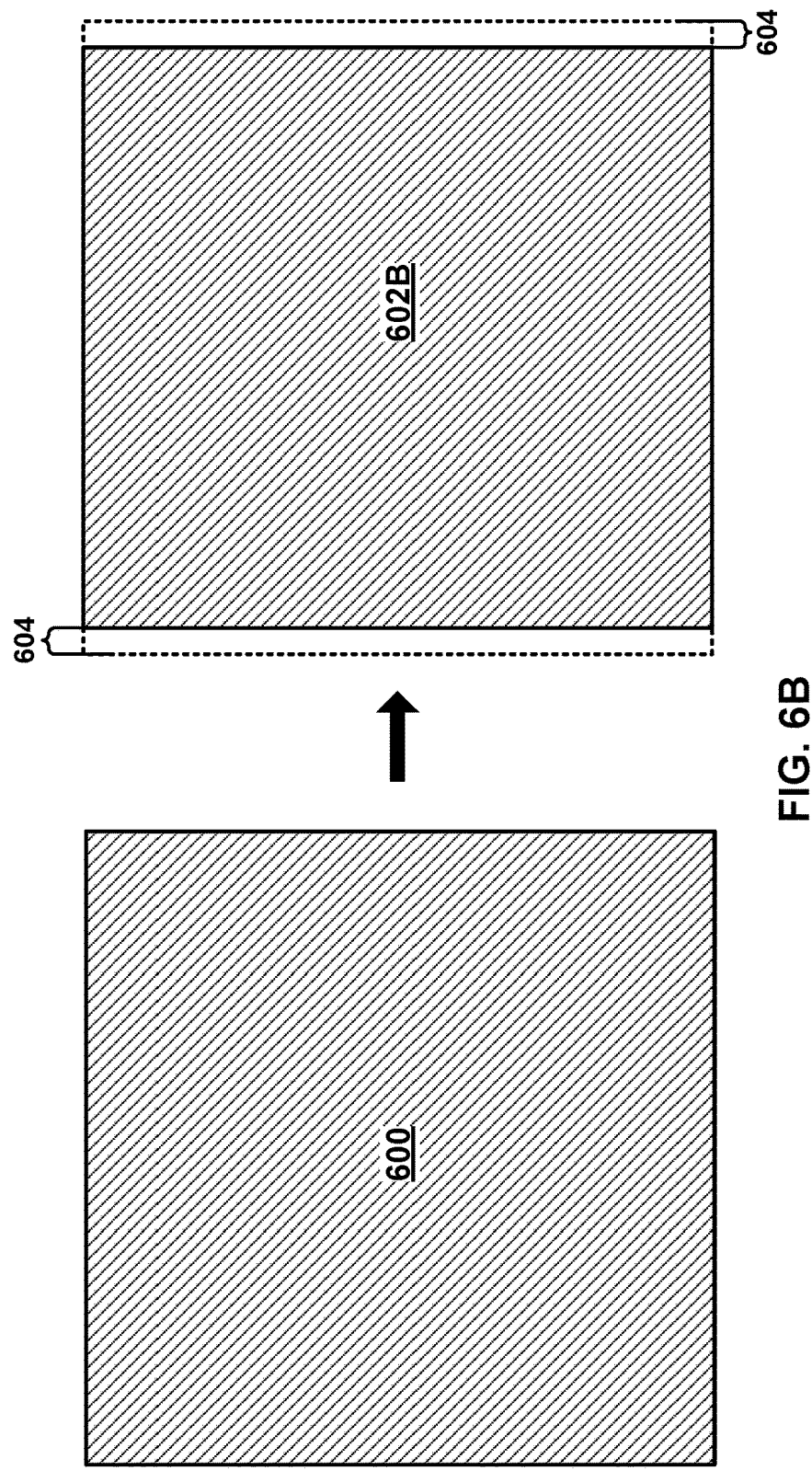

SEARCH REGION DETERMINATION FOR INTER CODING WITHIN A PARTICULAR PICTURE OF VIDEO DATA

RELATED APPLICATIONS

This application is related to U.S. Provisional Application No. 62/159,839, filed May 11, 2015, U.S. Provisional Application No. 62/173,248, filed Jun. 9, 2015, and U.S. Provisional Application No. 62/175,179, filed Jun. 12, 2015, the entire contents of each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques, in a video coding process, for adjusting a size of a search region from which a predictor block is selected based on a resolution of a motion vector that identifies the predictor block.

In one example, a method for encoding video data includes determining a resolution that will be used for a motion vector that identifies a predictor block in a current picture of video data for a current block in the current picture of video data; determining, based on the determined resolution, a search region for the current block such that a size of the search region is smaller where the resolution is fractional-pixel than where the resolution is integer-pixel; selecting, from within the search region, a predictor block for the current block; determining the motion vector that identifies the selected predictor block for the current block; and encoding, in a coded video bitstream, a representation of the motion vector.

In another example, a device for encoding video data includes a memory configured to store a portion of the video data, and one or more processors. In this example, the one or more processors are configured to: determine a resolution that will be used for a motion vector that identifies a predictor block in a current picture of video data for a current block in the current picture of video data; determine, based on the determined resolution, a search region for the current block such that a size of the search region is smaller where the resolution is fractional-pixel than where the resolution is integer-pixel; select, from within the search region, a predictor block for the current block; determine the motion vector that identifies the selected predictor block for the current block; and encode, in a coded video bitstream, a representation of the motion vector.

In another example, an apparatus for encoding video data includes means for determining a resolution that will be used for a motion vector that identifies a predictor block in a current picture of video data for a current block in the current picture of video data; means for determining, based on the determined resolution, a search region for the current block such that a size of the search region is smaller where the resolution is fractional-pixel than where the resolution is integer-pixel; means for selecting, from within the search region, a predictor block for the current block; means for determining the motion vector that identifies the selected predictor block for the current block; and means for encoding, in a coded video bitstream, a representation of the motion vector.

In another example, a computer-readable storage medium stores instructions that, when executed, cause one or more processors of a video encoding device to: determine a resolution that will be used for a motion vector that identifies a predictor block in a current picture of video data for a current block in the current picture of video data; determine, based on the determined resolution, a search region for the current block such that a size of the search region is smaller where the resolution is fractional-pixel than where the resolution is integer-pixel; select, from within the search region, a predictor block for the current block; determine the motion vector that identifies the selected predictor block for the current block; and encode, in a coded video bitstream, a representation of the motion vector.

In another example, a method for decoding video data includes obtaining, from a coded video bitstream, a representation of a motion vector that identifies a predictor block in a current picture of video data for a current block in the current picture of video data; determining whether the motion vector has fractional-pixel resolution or integer-pixel resolution; determining, based on the motion vector, a predictor block for the current block from within a search region having a size that is smaller where the resolution is fractional-pixel than where the resolution is integer-pixel; in response to determining that the motion vector has fractional-pixel resolution, determining, using fractional-pixel interpolation and based at least in part on sample pixel values from outside of the predictor block, pixel values of the predictor block; and reconstructing the current block based on the pixel values of the predictor block.

In another example, a device for decoding video data includes a memory configured to store a portion of the video data, and one or more processors. In this example, the one or more processors are configured to: obtain, from a coded video bitstream, a representation of a motion vector that identifies a predictor block in a current picture of video data for a current block in the current picture of video data; determine whether the motion vector has fractional-pixel resolution or integer-pixel resolution; determine, based on the motion vector, a predictor block for the current block from within a search region having a size that is smaller where the resolution is fractional-pixel than where the resolution is integer-pixel; in response to determining that the motion vector has fractional-pixel resolution, determine, using fractional-pixel interpolation and based at least in part on sample pixel values from outside of the predictor block, pixel values of the predictor block; and reconstruct the current block based on the pixel values of the predictor block.

In another example, an apparatus for decoding video data includes means for obtaining, from a coded video bitstream, a representation of a motion vector that identifies a predictor block in a current picture of video data for a current block in the current picture of video data; means for determining whether the motion vector has fractional-pixel resolution or integer-pixel resolution; means for determining, based on the motion vector, a predictor block for the current block from within a search region having a size that is smaller where the resolution is fractional-pixel than where the resolution is integer-pixel; means for in response to determining that the motion vector has fractional-pixel resolution, determining, using fractional-pixel interpolation and based at least in part on sample pixel values from outside of the predictor block, pixel values of the predictor block; and means for reconstructing the current block based on the pixel values of the predictor block.

In another example, a computer-readable storage medium stores instructions that, when executed, cause one or more processors of a video decoding device to: obtain, from a coded video bitstream, a representation of a motion vector that identifies a predictor block in a current picture of video data for a current block in the current picture of video data; determine whether the motion vector has fractional-pixel resolution or integer-pixel resolution; determine, based on the motion vector, a predictor block for the current block from within a search region having a size that is smaller where the resolution is fractional-pixel than where the resolution is integer-pixel; in response to determining that the motion vector has fractional-pixel resolution, determine, using fractional-pixel interpolation and based at least in part on sample pixel values from outside of the predictor block, pixel values of the predictor block; and reconstruct the current block based on the pixel values of the predictor block.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 6A and 6B are diagrams illustrating example search regions from which a predictor block may be selected, in accordance with one or more techniques of this disclosure.

DETAILED DESCRIPTION

Figure 1:
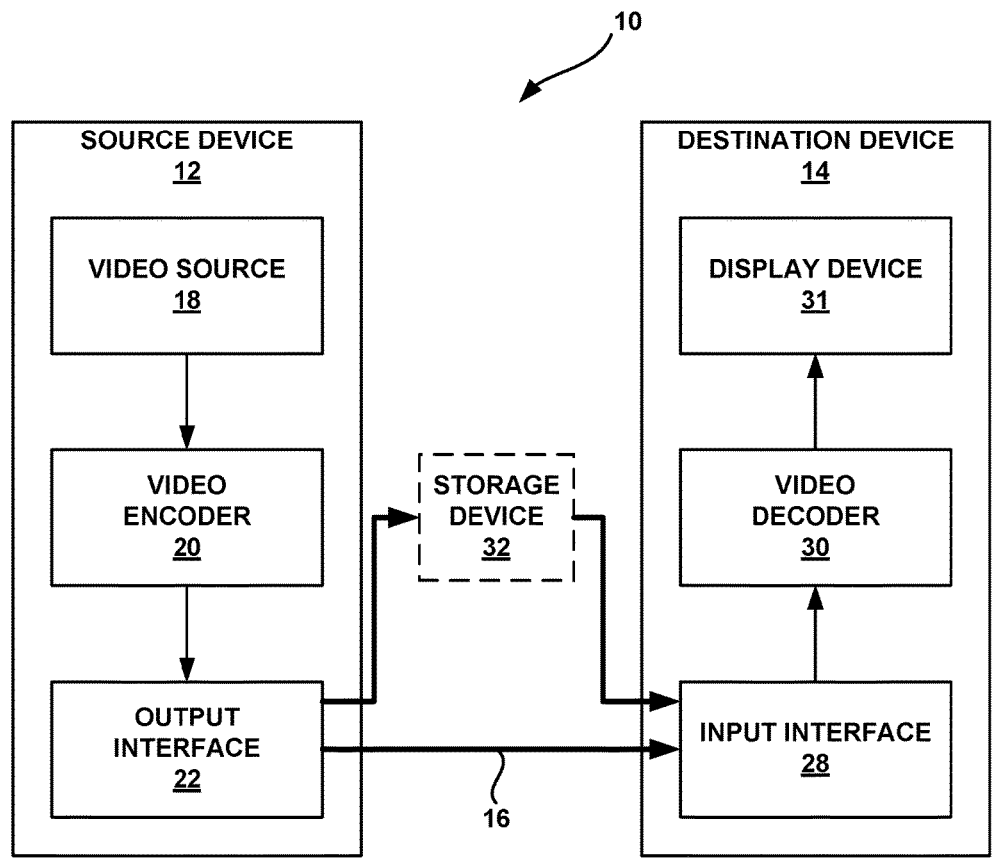
FIG. 1 is a block diagram illustrating an example video encoding and decoding system that may implement the techniques of this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for pixels in the block and coding residual values. The prediction values are formed using pixel samples in one or more predictive blocks. The residual values represent the differences between the pixels of the original block and the predicted pixel values. Specifically, the original block of video data includes an array of pixel values, and the predicted block includes an array of predicted pixel values. The residual values represent to pixel-by-pixel differences between the pixel values of the original block and the predicted pixel values.

Prediction techniques for a block of video data are generally categorized as intra-prediction and inter-prediction. Intra-prediction, or spatial prediction, does not include prediction from any reference picture. Instead, the block is predicted from pixel values of neighboring, previously coded blocks. Inter-prediction, or temporal prediction, generally involves predicting the block from pixel values of one or more previously coded reference pictures (e.g., frames or slices) selected from one or more reference picture lists (RPLs). A video coder may include one or more reference picture buffers configured to store the pictures included in the RPLs.

Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics region, repeated patterns (such as characters, icons, symbols, etc.) often exist. Intra Block Copying (Intra BC) is a technique which may enable a video coder to remove such redundancy and improve intra-picture coding efficiency. In some instances, Intra BC alternatively may be referred to as Intra motion compensation (MC).

According to some Intra BC techniques, video coders may use reconstructed pixels in a block of previously coded video data that is within the same picture as the current block of video data for prediction of the pixels of the current block. In some examples, the block of previously coded video data may be referred to as a predictor block or a predictive block. A video coder may use a motion vector to identify the predictor block. In some examples, the motion vector may also be referred to as a block vector, an offset vector, or a displacement vector. In some examples, a video coder may use a one-dimensional motion vector to identify the predictor block. Accordingly, some video coders may predict a current block of video data based on blocks of previously coded video data that share only the same set of x-values (i.e., vertically in-line with the current block) or the same set of y-values (i.e., horizontally in-line with the current block). In other examples, a video coder may use a two-dimensional motion vector to identify the predictor block. For instance, a video coder may use a two-dimensional motion vector that has a horizontal displacement component and a vertical displacement component, each of which may be zero or non-zero. The horizontal displacement component may represent a horizontal displacement between the predictor block of video data and a current block of video data and the vertical displacement component may represent a vertical displacement between the predictor block of video data and the current block of video data.

For Intra BC, the pixels of the predictor block may be used as predictive samples for corresponding pixels in the block (i.e., the current block) that is being coded. The video coder may additionally determine a residual block of video data based on the current block of video data and the prediction block, and code the two-dimensional motion vector and the residual block of video data.

In some examples, Intra BC may be an efficient coding tool, especially for screen content coding. For instance, in some examples, coding blocks using Intra BC may result in a smaller bitstream than the bitstream that would be produced by coding blocks using inter or intra coding. As discussed above, Intra BC is an inter-like coding tool (meaning that pixel values for a picture are predicted from other pixel values in the picture), but uses reference data from the same picture as the block being coded. In some examples, it may be difficult to integrate Intra BC into conventional intra pictures due to one or more constraints applied to Intra BC, which may not be preferred in practical design. Some example constraints include, but are not limited to, that the predictor block must be within the same slice or tile as the current block to be coded, that the predictor block must not overlap the current block to be coded, that all pixels in the predictor block must be reconstructed, that the predictor block be within a certain region (e.g., due to considerations relating to parallelization implementation as described in Rapaka et al., "On parallel processing capability of intra block copy," Document: JCTVC-S0220, JCT-VC of ITU-T SG 16 WP 3 and ISO/IEC JTC 1/SC 29/WG 11, 19$^{th}$ Meeting: Strasbourg, FR 17-24 Oct. 2014) (hereinafter "JCTVC-S0220"), and, when constrained intra prediction is enabled, that the predictor block must not include any pixel coded using the conventional inter mode. Additionally, in some examples, the hardware architecture for conventional intra and inter frames may not be reused for Intra BC without modification (e.g., due to Intra BC resulting in block copy inside a picture). As such, it may be desirable to enable a video coder to gain the efficiencies provided by Intra BC while maintaining some or all of the constraints currently applied to Intra BC, and without (significant) modification to the hardware architecture.

In some examples, as opposed to predicting a block of a current picture based on samples in the current picture using conventional intra prediction techniques, a video coder may perform Intra BC to predict a block in a current picture based on samples in the current picture using techniques similar to conventional inter prediction. For instance, a video coder may include the current picture in a reference picture list (RPL) used to predict the current picture, store a version of the current picture (or at least the portion of the current picture that has been reconstructed) in a reference picture buffer, and code the block of video data in the current picture based on a predictor block of video data included in the version of the current picture stored in the reference picture buffer. In this way, a video coder may gain the efficiencies provided by Intra BC while maintaining some or all of the constraints currently applied to Intra BC. Also, in this way, a video coder may reuse the hardware architecture for conventional intra and inter frames for Intra BC without significant modification.

As discussed above, a video encoder may select a predictor block for a current block of video data from within the same picture. In some examples, a video encoder may evaluate several candidate predictor blocks and select the candidate predictor block that closely matches the current block, in terms of pixel difference, which may be determined by sum of absolute difference (SAD), sum of square difference (SSD), or other difference metrics.

In some examples, the motion vector used to identify the predictor block in the current picture may have integer-pixel resolution. For instance, the motion vector may include one or more whole numbers that represent the displacement between a current block and a predictor block in increments of a single pixel. As one example, a motion vector that has integer-pixel resolution may include a first integer (e.g., 3) that represents the horizontal displacement between a current block and a predictor block and a second integer (e.g., 2) that represents the vertical displacement between the current block and the predictor block.

In some examples, the motion vector used to identify the predictor block in the current picture may have fractional-pixel resolution. For instance, the motion vector may include one or more values that represent the displacement between a current block and a predictor block in increments of less than a single pixel. Some example resolutions that a fractional-pixel motion vector may have include, but are not necessarily limited to, half-pixel resolution (e.g., ½ pel resolution), quarter-pixel resolution (e.g., ¼ pel resolution), and eighth-pixel resolution (e.g., ⅛ pel resolution), etc. As one example, a motion vector that has quarter-pixel resolution may include a first value (e.g., 2.75) that represents the horizontal displacement between a current block and a predictor block and a second value (e.g., 2.5) that represents the vertical displacement between the current block and the predictor block.

In some examples, such as where the motion vector has integer-pixel resolution, the sample pixel values identified by the motion vector may fall at integer-pixel positions and thus, a video coder may access said sample pixel values without interpolation. As a video coder may access the sample pixels without interpolation, the video coder may only use sample pixel values located inside the predictor block to predict the current block where the motion vector has integer-pixel resolution. In some examples, such as where the motion vector has fractional-pixel resolution, the sample pixel values identified by the motion vector may not fall at integer-pixel positions and thus, a video coder may need to perform interpolation to construct the sample pixel values. In some examples, to perform interpolation to construct the sample pixels, the video coder may need to use sample pixel values located both inside and outside the predictor block to predict the current block. However, in some examples, it may not be desirable for a video coder to use sample pixel values located outside a predictor block to predict a current block. For instance, when the predictor block and the current block are located in the current picture, it may not be possible for a video decoder to use sample pixel values located outside the predictor block because such samples may not be available (i.e., such samples may not be located in the already reconstructed regions of the current picture).

In accordance with one or more techniques of this disclosure, a video coder may select a predictor block for a current block from within a search region determined based on a resolution to be used for a motion vector that identifies the predictor block. For instance, a video coder may use a smaller search region when the resolution to be used for the motion vector is fractional-pixel than then when the resolution to be used for the motion vector is integer-pixel. As one example, when the resolution to be used for the motion vector is integer-pixel, a video coder may select the predictor block from within an initial search region that includes a reconstructed region of the current picture. As another example, when the resolution to be used for the motion vector is fractional-pixel, a video coder may select the predictor block from within a reduced search region that is determined by reducing the size of the initial search region by M samples from right and bottom boundaries of the initial search region and reducing the size of the initial search region by N samples from top and left boundaries of the initial search region. In this way, a video coder may ensure that all sample pixel values needed to construct the predictor block, including sample pixel values located outside the predictor block, are available for use when coding the current block based on the predictor block.

This disclosure describes example techniques related to utilizing a current picture as a reference picture when predicting portions of the current picture. To assist with understanding, the example techniques are described with respect to range extensions (RExt) to the High Efficiency Video Coding (HEVC) video coding standard, including the support of possibly high bit depth (e.g, more than 8 bit), different chroma sampling formats, including 4:4:4, 4:2:2, 4:2:0, 4:0:0 and the like. The techniques may also be applicable for screen content coding. It should be understood that the techniques are not limited to range extensions or screen content coding, and may be applicable generally to video coding techniques including standards based or non-standards based video coding. Also, the techniques described in this disclosure may become part of standards developed in the future. In other words, the techniques described in this disclosure may be applicable to previously developed video coding standards, video coding standards currently under development, and forthcoming video coding standards.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The finalized HEVC specification, hereinafter referred to as HEVC version 1, is entitled ITU-T Telecommunication Standardization Sector of ITU, Series H: Audiovisual and Multimedia Systems, Infrastructure of Audiovisual Services—Coding of Moving Video: High Efficiency Video Coding, H.265, April 2015, is available from http://www.i-tu.int/rec/T-REC-H.265-201504-I. The Range Extensions to HEVC, namely HEVC RExt, are also being developed by the JCT-VC. A recent Working Draft (WD) of Range extensions, entitled High Efficiency Video Coding (HEVC) Range Extensions text specification: Draft 7, Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, Document: JCTVC-Q1005 v4, hereinafter referred to as "RExt WD 7", is available from http://phenix.int-evey.fr/jct/doc_end_user/documents/17_Valencia/wg11/JCTVC-Q1005-v4.zip.

The range extension specification may become version 2 of the HEVC specification. However, in a large extent, as far as the proposed techniques are concerned, e.g., motion vector (MV) prediction, HEVC version 1 and the range extension specification are technically similar. Therefore whenever changes are referred to as based on HEVC version 1, the same changes may apply to the range extension specification, and whenever the HEVC version 1 module is described, the description may also be applicable to the HEVC range extension module (with the same sub-clauses).

Recently, investigation of new coding tools for screen-content material such as text and graphics with motion was requested, and technologies that improve the coding efficiency for screen content have been proposed. Because there is evidence that significant improvements in coding efficiency can be obtained by exploiting the characteristics of screen content with novel dedicated coding tools, a Call for Proposals (CfP) is being issued with the target of possibly developing future extensions of the High Efficiency Video Coding (HEVC) standard including specific tools for screen content coding (SCC). A recent Working Draft (WD) of the SCC Specification, hereinafter referred to as "SCC WD 6", is available from http://phenix.it-sudparis.eu/jct/doc_end_user/documents/22_Geneva/wg11/JCTVC-W1005-v1.zip.

FIG. 1 is a block diagram illustrating an example video encoding and decoding system 10 that may implement the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart"

phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 of source device 12 to a storage device 32. Similarly, encoded data may be accessed from the storage device 32 by input interface 28 of destination device 14. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may store the encoded video generated by source device 12.

Destination device 14 may access stored video data from the storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for improved intra block copy signaling in video coding may be performed by any digital video encoding and/or decoding device. Although generally the techniques of this disclosure are performed by a video encoding or decoding device, the techniques may also be performed by a combined video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16 or storage device 32. The information of computer-readable medium 16 or storage device 32 may include syntax information defined by video encoder 20, which is also used by video decoder 30, that includes syntax elements that describe characteristics and/or processing of blocks and other coded units, e.g., GOPs. Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard. While the techniques of this disclosure are not limited to any particular coding standard, the techniques may be relevant to the HEVC standard, and particularly to the extensions of the HEVC standard, such as the SCC extension.

In general, HEVC describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block (CTB) of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Video encoder 20 and video decoder 30 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views. Intra-mode (I mode) may refer to any of several spatial based compression modes. Inter-modes, such as uni-directional prediction (P mode) or bi-prediction (B mode), may refer to any of several temporal-based compression modes.

In some examples, such as when coding screen content, video encoder 20 and/or video decoder 30 may perform Intra BC using techniques similar to conventional inter prediction. For instance, to encode a current block of a current picture of video data, video encoder 20 may select a predictor block of video data included in a version of the current picture stored in a reference picture buffer, encode a motion vector that identifies the position of the predictor block relative to the current block in the current picture, and encode a residual block of video data that represents difference between the current block of video data and the predictor block.

In some examples, video encoder 20 may use integer-pixel resolution for the motion vector. In some examples, video encoder 20 may use fractional-pixel resolution for the motion vector.

In some examples, such as where the motion vector has integer-pixel resolution, the sample pixel values identified by the motion vector may fall at integer-pixel positions and thus, video encoder 20 and/or video decoder 30 may access said sample pixel values without interpolation. As video encoder 20 and/or video decoder 30 may access the sample pixels without interpolation, video encoder 20 and/or video decoder 30 may only use sample pixel values located inside the predictor block to predict the current block where the motion vector has integer-pixel resolution. In some examples, such as where the motion vector has fractional-pixel resolution, the sample pixel values identified by the motion vector may not fall at integer-pixel positions and thus, video encoder 20 and/or video decoder 30 may need to perform interpolation to construct said sample pixel values. In some examples, to perform interpolation to construct the sample pixels, video encoder 20 and/or video decoder 30 may need to use sample pixel values located both inside and outside the predictor block to predict the current block. However, in some examples, it may not be desirable for video encoder 20 and/or video decoder 30 to use sample pixel values located outside a predictor block to predict a current block. For instance, when the predictor block and the current block are located in the current picture, it may not be possible for video decoder 30 to use sample pixel values located outside the predictor block because such samples may not be available (i.e., may not be located in the reconstructed region of the current picture).

In accordance with one or more techniques of this disclosure, video encoder 20 may select a predictor block for a current block from within a search region determined based on a resolution to be used for a motion vector that identifies the predictor block. For instance, video encoder 20 may use a smaller search region when the resolution to be used for the motion vector is fractional-pixel precision than then when the resolution to be used for the motion vector is integer-pixel precision. As one example, when the resolution to be used for the motion vector is integer-pixel, video encoder 20 may select the predictor block from within an initial search region that includes a reconstructed region of the current picture. As another example, when the resolution to be used for the motion vector is fractional-pixel, video encoder 20 may select the predictor block from within a reduced search region that is determined by reducing the size of the initial search region by M samples from right and bottom boundaries of the initial search region and reducing the size of the initial search region by N samples from top and left boundaries of the initial search region. In this way, video encoder 20 may ensure that all sample pixel values needed to construct the predictor block, including sample pixel values located outside the predictor block, are available for use by video decoder 30 when decoding the current block based on the predictor block. As such, video encoder 20 may avoid an encoder/decoder mismatch.

Figure 2:
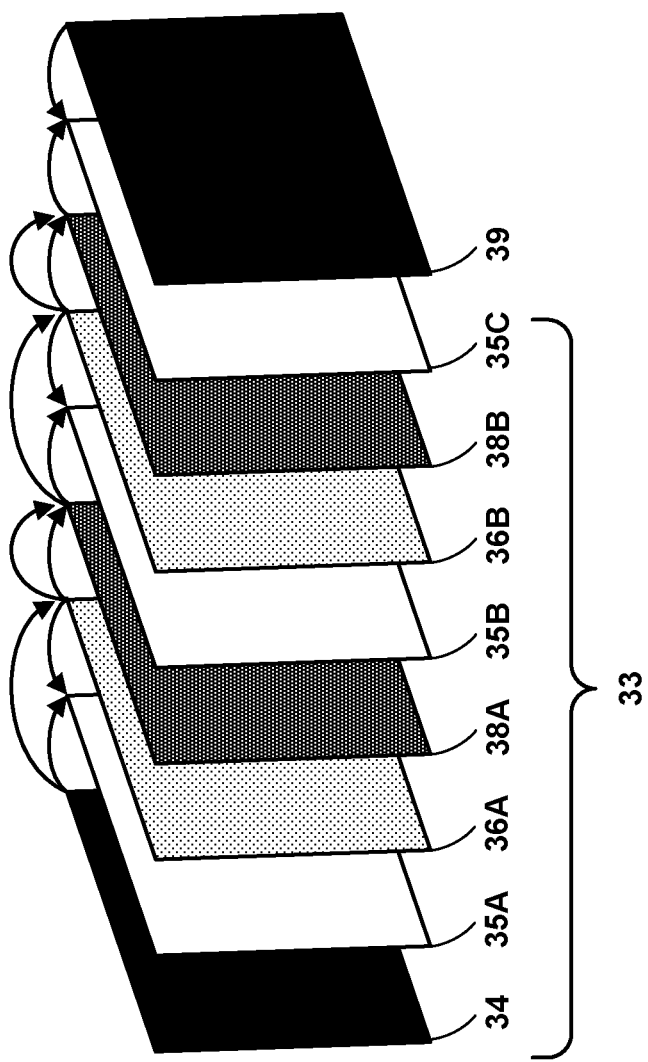
FIG. 2 is a conceptual diagram illustrating an example video sequence, in accordance with one or more techniques of this disclosure.

FIG. 2 is a conceptual diagram illustrating an example video sequence 33 that includes pictures 34, 35A, 36A, 38A, 35B, 36B, 38B, and 35C, in display order. One or more of these pictures may include P-slices, B-slices, or I-slices. In some cases, video sequence 33 may be referred to as a group of pictures (GOP). Picture 39 is a first picture in display order for a sequence occurring after video sequence 33. FIG. 2 generally represents an example prediction structure for a video sequence and is intended only to illustrate the picture references used for encoding different inter-predicted slice types. An actual video sequence may contain more or fewer video pictures that include different slice types and in a different display order.

For block-based video coding, each of the video pictures included in video sequence 33 may be partitioned into video blocks or coding units (CUs). Each CU of a video picture may include one or more prediction units (PUs). In some examples, the prediction methods available to predict PUs within a picture may depend on the picture type. As one example, video blocks or PUs in slices of an intra-predicted picture (an I-picture) may be predicted using intra-prediction modes (i.e., spatial prediction with respect to neighboring blocks in the same picture). As another example, video blocks or PUs in slices of an inter-predicted picture (a B-picture or a P-picture) may be predicted using inter or intra-prediction modes (i.e., spatial prediction with respect to neighboring blocks in the same picture or temporal prediction with respect to other reference pictures). In other words, an I-picture may include I-slices, a P-picture may include both I-slices and P-slices, and a B-picture may include I-slices, P-slices, and B-slices.

Video blocks of a P-slice may be encoded using uni-directional predictive coding from a reference picture identified in a reference picture list. Video blocks of a B-slice may be encoded using bi-directional predictive coding from multiple reference picture identified in multiple reference picture lists.

In the example of FIG. 2, first picture 34 is designated for intra-mode coding as an I-picture. In other examples, first picture 34 may be coded with inter-mode coding, e.g., as a P-picture, or B-picture, with reference to a first picture of a preceding sequence. Video pictures 35A-35C (collectively "video pictures 35") are designated for coding as B-pictures using bi-prediction with reference to a past picture and a future picture. As illustrated in the example of FIG. 2, picture 35A may be encoded as a B-picture with reference to first picture 34 and picture 36A, as indicated by the arrows from picture 34 and picture 36A to video picture 35A. In the example of FIG. 2, first picture 34 and picture 36A may be included in reference picture lists used during prediction of blocks of picture 35A. Pictures 35B and 35C are similarly encoded.

Video pictures 36A-36B (collectively "video pictures 36") may be designated for coding as P-pictures, or B-pictures, using uni-direction prediction with reference to a past picture. As illustrated in the example of FIG. 2, picture 36A is encoded as a P-picture, or B-picture, with reference to first picture 34, as indicated by the arrow from picture 34 to video picture 36A. Picture 36B is similarly encoded as a P-picture, or B-picture, with reference to picture 38A, as indicated by the arrow from picture 38A to video picture 36B.

Video pictures 38A-38B (collectively "video pictures 38") may be designated for coding as P-pictures, or B-pictures, using uni-directional prediction with reference to the same past picture. As illustrated in the example of FIG. 2, picture 38A is encoded with two references to picture 36A, as indicated by the two arrows from picture 36A to video picture 38A. Picture 38B is similarly encoded.

In some examples, each of the pictures may be assigned a unique value (that is, a value that is unique to a particular video sequence, e.g., a sequence of pictures following an instantaneous decoder refresh (IDR) picture in decoding order) that indicates the order in which the pictures are to be output. This unique value may be referred to as the picture order count (POC). In some examples, the order in which the pictures are to be output may be different than the order in which the pictures are coded. For instance, picture 35A may be output before picture 36A while picture 36A may be coded before picture 35A.

In some examples, a video coder (e.g., video encoder 20 or video decoder 30) may perform Intra BC by inserting a current picture in a reference picture list (RPL) used to predict blocks in the current picture. For instance, in the example of FIG. 2, a video coder may insert an indication of picture 35A, along with indications of picture 34 and picture 36A, in RPLs used to predict blocks in picture 35A. The video coder may then use picture 35A as a reference picture when coding blocks of picture 35A.

In accordance with one or more techniques of this disclosure, a video coder may select a predictor block in a current picture for a current block in the current picture from within a search region determined based on a resolution to be used for a motion vector that identifies the predictor block. Video encoder 20 may determine, based on the determined resolution, a search region for the current block such that a size of the search region is smaller where the resolution is fractional-pixel than where the resolution is integer-pixel.

Figure 3:
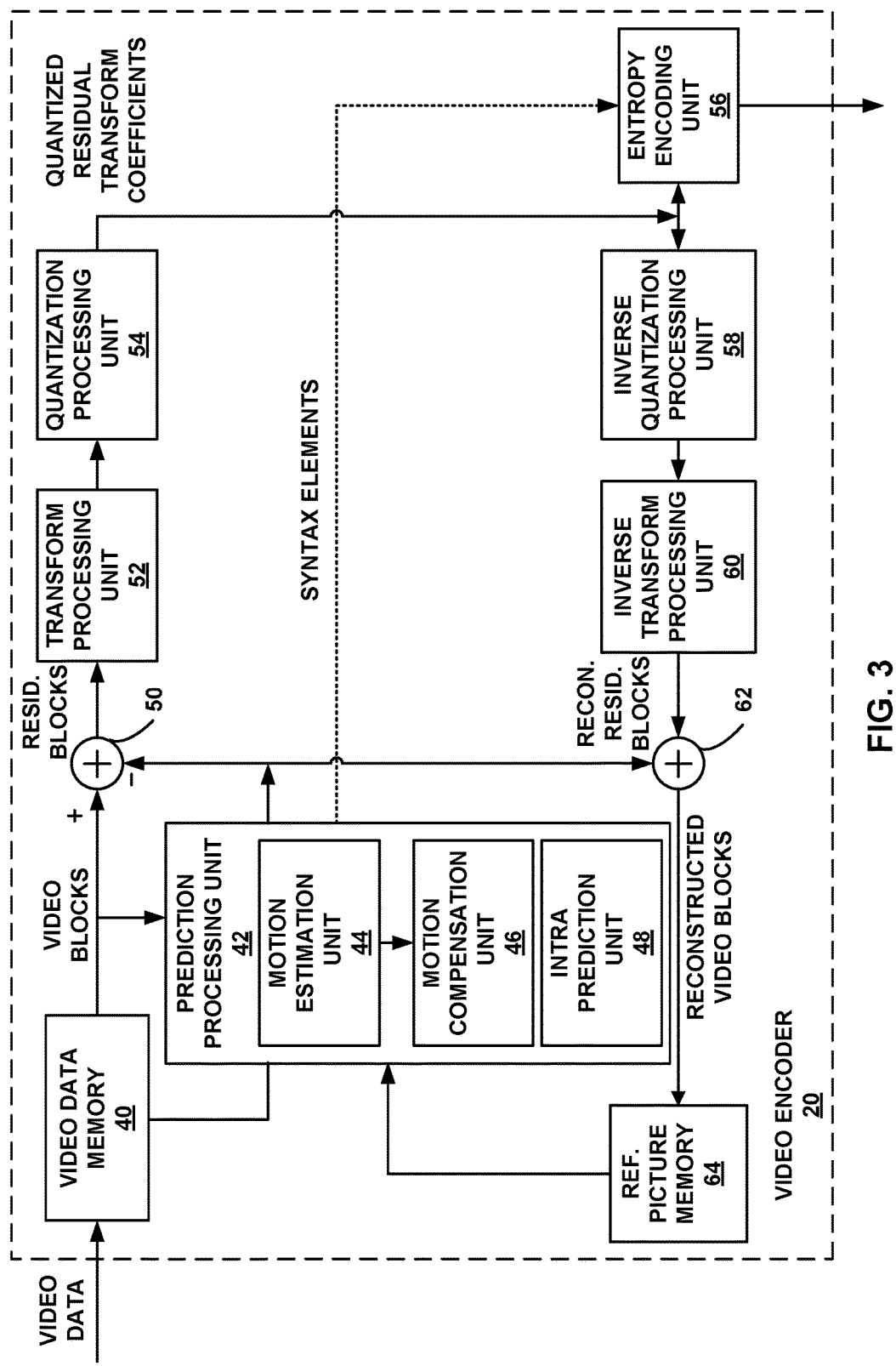
FIG. 3 is a block diagram illustrating an example of a video encoder that may use techniques for intra block copy described in this disclosure.

FIG. 3 is a block diagram illustrating an example of a video encoder 20 that may use techniques for intra block copy described in this disclosure. The video encoder 20 will be described in the context of HEVC coding for purposes of illustration, but without limitation of this disclosure as to other coding standards. Moreover, video encoder 20 may be configured to implement techniques in accordance with the range extensions of HEVC.

Video encoder 20 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views.

In the example of FIG. 3, video encoder 20 may include video data memory 40, prediction processing unit 42, reference picture memory 64, summer 50, transform processing unit 52, quantization processing unit 54, and entropy encoding unit 56. Prediction processing unit 42, in turn, includes motion estimation unit 44, motion compensation unit 46, and intra-prediction unit 48. For video block reconstruction, video encoder 20 also includes inverse quantization processing unit 58, inverse transform processing unit 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

During the encoding process, video encoder 20 receives a video picture or slice to be coded. The picture or slice may be divided into multiple video blocks. Motion estimation unit 44 and motion compensation unit 46 perform inter-predictive coding of the received video block relative to one or more blocks in one or more reference pictures to provide temporal compression or provide inter-view compression. Intra-prediction unit 48 may alternatively perform intra-predictive coding of the received video block relative to one or more neighboring blocks in the same picture or slice as the block to be coded to provide spatial compression. Video encoder 20 may perform multiple coding passes (e.g., to select an appropriate coding mode for each block of video data).

Moreover, a partition unit (not shown) may partition blocks of video data into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). Prediction processing unit 42 may further produce a quadtree data structure indicative of partitioning of an LCU into sub-CUs. Leaf-node CUs of the quadtree may include one or more PUs and one or more TUs.

Prediction processing unit 42 may select one of the coding modes, intra or inter, e.g., based on error results, and provides the resulting intra- or inter-coded block to summer 50 to generate residual block data and to summer 62 to reconstruct the encoded block for use as a reference picture. Prediction processing unit 42 also provides syntax elements, such as motion vectors, intra-mode indicators, partition information, and other such syntax information, to entropy encoding unit 56.

Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found by video encoder 20 to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with either integer-pixel precision or fractional-pixel precision.

Motion estimation unit 44 calculates a motion vector for a PU of a video block in an inter-coded slice by comparing the position of the PU to the position of a predictive block of a reference picture. The reference picture may be selected from one or more reference picture lists (RPLs) which identify one or more reference pictures stored in reference picture memory 64. Motion estimation unit 44 sends the calculated motion vector to entropy encoding unit 56 and motion compensation unit 46. In some examples, motion estimation unit 44 may send an indication of the selected reference picture to entropy encoding unit 56.

As discussed above, motion estimation unit 44 may send an indication of the selected reference picture to entropy encoding unit 56. In some examples, motion estimation unit 44 may send the indication by sending the index value of the selected reference picture within the RPL.

In some examples, as opposed to restricting inter-prediction to use other pictures as reference pictures, motion estimation unit 44 may use a current picture as a reference picture to predict blocks of video data included in the current picture. For example, motion estimation unit 44 may store a version of a current picture in reference picture memory 64. In some examples, motion estimation unit 44 may store an initialized version of the current picture with pixel values initialized to a fixed value. In some examples, the fixed value may be based on a bit depth of samples of the current picture. For instance, the fixed value may be 1<< (bitDepth−1). In some examples, motion estimation unit 44 may store the initialized version of the current picture before encoding any blocks of the current picture. By storing an initialized version of the current picture, motion estimation unit 44 may not be required to constrain the search for predictive blocks (i.e., a search region) to blocks that are already reconstructed. By contrast, if motion estimation unit 44 does not store an initialized version of the current picture, the search for predictive blocks may be constrained to blocks that are already reconstructed to, for example, avoid a decoder/encoder mismatch.

Prediction processing unit 42 may generate one or more RPLs for the current picture. For instance, prediction processing unit 42 may include the current picture in an RPL for the current picture.

As discussed above, when encoding a block of video data of a current picture of video data, motion estimation unit 44 may select a predictive block that closely matches the current block. In some examples, as opposed to (or in addition to) searching blocks of other pictures, motion estimation unit 44 may select a block located in the current picture for use as a predictive block for the current block of the current picture. For example, motion estimation unit 44 may perform a search on pictures including one or more reference pictures, including the current picture. For each picture, motion estimation unit 44 may calculate search results reflecting how well a predicted block matches the current block, e.g., using pixel-by-pixel sum of absolute differences (SAD), sum of squared differences (SSD), mean absolute difference (MAD), mean squared difference (MSD), or the like. Then, motion estimation unit 44 may identify a block in a picture having the best match to the current block, and indicate the position of the block and the picture (which may be the current picture) to prediction processing unit 42. In this way, motion estimation unit 44 may perform Intra BC, e.g., when motion estimation unit 44 determines that a predictor block is included in the current picture, that is, the same picture as the current block being predicted.

In some examples, to make sure that the predictor block for Intra BC is valid, RExt WD 7 provides that prediction processing unit 42 enforce one or more bitstream conformance constraints. As one example, prediction processing unit 42 may ensure that the predictor block is within the same slice/tile as the current CU. As another example, prediction processing unit 42 may ensure that the reference block cannot overlap with current CU. As another example, prediction processing unit 42 may ensure that all the pixels inside the predictor block should be reconstructed. As another example, as described by Rapaka et al., "On parallel processing capability of intra block copy," Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0220, available at http://phenix.it-sudparis.eu/jct/doc_end_user/documents/19_Strasbourg/wg11/JCTVC-S0220-v2.zip, prediction processing unit 42 may ensure that the predictor block is be within a certain region due to parallelization implementation considerations. As another example, when constrained intra prediction is enabled, prediction processing unit 42 may ensure that the predictor block does not include any pixel coded with the conventional inter mode. As another example, prediction processing unit 42 may ensure that the motion used for prediction has integer-pixel precision to avoid interpolation.

In some examples, as opposed to always using integer-pixel precision, prediction processing unit 42 may determine the motion vector with different levels of precision. For instance, prediction processing unit 42 may determine the motion vector with integer precision, default precision, or finest motion precision (e.g., ¼ pixel ("pel") precision in HEVC). In some examples, prediction processing unit 42 may encode a syntax element that indicates the precision of the coded Intra BC motion vectors, e.g., in a SPS or VPS referred to by the current picture. In some examples, the precision of the Intra BC motion vectors may be adaptive at the picture level and prediction processing unit 42 may cause entropy encoding unit 56 to encode a syntax element that indicates the precision of the coded Intra BC motion vectors, e.g., in a PPS or slice referred to by the current block. For instance, in some proposals for SCC, adaptive MV resolution (AMVR) is used. For instance, as described in Li et al., "Adaptive motion vector resolution for screen content," Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0085, available at http://phenix.it-sudparis.eu/jct/doc_end_user/documents/19_Strasbourg/wg11/JCTVC-S0085-v3.zip, for each slice, the MV can be represented and coded with either integer-pixel resolution or quarter-pixel resolution, and the flag use_integer_mv_flag is signalled in a slice header to indicate which motion vector resolution is used.

In some examples, such as where the motion vector has integer-pixel resolution, the sample pixel values identified by the motion vector may fall at integer-pixel positions and thus, prediction processing unit 42 may access the sample pixel values without interpolation. As prediction processing unit 42 may access the sample pixels without interpolation, prediction processing unit 42 may only use sample pixel values located inside the predictor block to predict the current block where the motion vector has integer-pixel resolution. In some examples, such as where the motion vector has fractional-pixel resolution, the sample pixel values identified by the motion vector may not fall at integer-pixel positions and thus, prediction processing unit 42 may need to perform interpolation to construct said sample pixel values. In some examples, to perform interpolation to construct the sample pixels, prediction processing unit 42 may need to use sample pixel values located both inside and outside the predictor block to predict the current block. However, in some examples, it may not be desirable for prediction processing unit 42 to use sample pixel values located outside a predictor block to predict a current block. For instance, when the predictor block and the current block are located in the current picture, it may not be possible for prediction processing unit 42 to use sample pixel values located outside the predictor block because such samples may not be available in reference picture memory 64 (i.e., may not be located in the reconstructed region of the current picture).

In accordance with one or more techniques of this disclosure, prediction processing unit 42 may determine a predictor block such that any samples that are used for the interpolation process, including samples that are included in and not included in the predictor block, meet the above-described bitstream conformance constraints. For example, motion estimation unit 44 may select a predictor block for a current block from within a search region determined based on a resolution to be used for a motion vector that identifies the predictor block. For instance, motion estimation unit 44 may use a smaller search region when the resolution to be used for the motion vector is fractional-pixel precision than then when the resolution to be used for the motion vector is integer-pixel precision. As one example, when the resolution to be used for the motion vector is integer-pixel precision, motion estimation unit 44 may select the predictor block from within an initial search region that includes a reconstructed region of the current picture. As another example, when the resolution to be used for the motion vector is fractional-pixel precision, motion estimation unit 44 may select the predictor block from within a reduced search region. In this way, motion estimation unit 44 may ensure that all sample pixel values needed to construct the predictor block, including sample pixel values located outside the predictor block, are available for use when coding the current block based on the predictor block.

As discussed above, a CU may comprise a coding block of luma samples and two corresponding coding blocks of chroma samples of a picture that has a luma sample array, a Cb sample array and a Cr sample array. In some examples, different sampling ratios may be used for the luma samples, Cb samples, and the Cr samples. In general the sampling ratio may be expressed as a three part ratio A:B:C where A represents a horizontal sampling reference (width of the conceptual region, which is usually four), B represents the number of chrominance (Cr, Cb) samples in the first row of A pixels, and C represents the number of changes of chrominance samples (Cr, Cb) between a first and second row of A pixels. Some example sampling ratios that may be used by video encoder 20 include, but are not necessarily limited to, 4:4:4, 4:2:2, 4:2:0, and 4:0:0. When using the 4:4:4 sampling ratio, video encoder 20 may sample each of the components at the same rate. When using the 4:2:2 sampling ratio, video encoder 20 may sample the chroma components (i.e., Cb and Cr) at half the sample rate of the luma component such that the horizontal chroma resolution is halved. When using the 4:2:0 sampling ratio, video encoder 20 may sample the chroma components (i.e., Cb and Cr) on alternating lines and at half the sample rate of the luma component such that both the horizontal and vertical chroma resolutions are halved. In some examples, video encoder 20 may encode a syntax element (e.g., chroma_format_idc) that indicates the sampling ratio.

In some examples, such as where the sampling ratio is 4:4:4, video encoder 20 may encode the luma and chroma components together. In some examples, video encoder 20 may encode the luma and chroma components separately. In some examples, video encoder 20 may encode a syntax element (e.g., separate_colour_plane_flag) that indicates whether the luma and chroma components are encoded together or separately.

In some examples, such as where the luma and chroma components are encoded separately, video encoder 20 may use different motion vectors for the luma and chroma components. For instance, video encoder 20 may use a luma motion vector to indicate a prediction block of luma samples and a chroma motion vector to indicate a prediction block of chroma samples. In some examples, video encoder 20 may encode both the luma motion vector and the chroma motion vector. In other examples, video encoder 20 may encode the luma motion vector and the chroma motion vector may be determined based on the luma motion vector and the sampling ratio. For instance, the chroma motion vector may be determined based on the luma motion vector in accordance with Equations (1) and (2), below, where $MVC_{Horizontal}$ and $MVC_{Vertical}$ are the horizontal and vertical components of the chroma motion vector, $MV_{Horizontal}$ and $MV_{Vertical}$ are the horizontal and vertical components of the luma motion vector, and SubWidthC and SubHeightC are determined using Table (1) based on the sampling ratio.

$$MVC_{Horizontal} = MV_{Horizontal} * 2 / \text{SubWidthC}$$

$$MVC_{Vertical} = MV_{Vertical} * 2 / \text{SubHeightC}$$

TABLE (1)

| Sampling Ratio | SubWidthC | SubHeightC |
|---|---|---|
| 4:2:0 | 2 | 2 |
| 4:2:2 | 2 | 1 |
| 4:4:4 | 1 | 1 |

In some examples, due to the derivation of the chroma motion vector from the luma motion vector, the resolution used for the luma motion vector may be different than the resolution used for the chroma motion vector. For instance, in some examples, the luma motion vector may have integer-pixel resolution and the chroma motion vector may have fractional-pixel resolution. As such, in accordance with one more techniques of this disclosure, motion estimation unit 44 may determine the size of the search region based on the resolution to be used for the chroma motion vector. For instance, when the resolution to be used for the chroma motion vector is integer-pixel, motion estimation unit 44 may select the predictor block from within an initial search region that includes a reconstructed region of the current picture. As another example, when the resolution to be used for the chroma motion vector is fractional-pixel, motion estimation unit 44 may select the predictor block from within a reduced search region that is smaller than the initial search region used when the resolution of the chroma motion vector is inter-pixel. In this way, motion estimation unit 44 may ensure that all sample pixel values needed to construct the predictor block, including sample chroma pixel values located outside the predictor block, are available for use when coding the current block based on the predictor block.

In some examples, motion estimation unit 44 may use the reduced search region for all sampling ratios. In other examples, motion estimation unit 44 may use the reduced search region when the ratio of chroma sampling relative to luma samples is greater than one (e.g., 4:2:0, 4:2:2). In some examples, motion estimation unit 44 may not use the reduced search region for monochrome (i.e., sampling ratios of 4:0:0). In some examples, motion estimation unit 44 may use the reduced search region for all sampling ratios other than monochrome.

As discussed above, in some examples, motion estimation unit 44 may select a predictor block from within a reduced search region. In some examples, motion estimation unit 44 may determine the reduced search region by reducing the size of the initial search region by M (e.g., 1, 2, 3, 4, 5, 6, 7, 8) samples from right and bottom boundaries of the initial search region and reducing the size of the initial search region by N (e.g., 1, 2, 3, 4, 5, 6, 7, 8) samples from top and left boundaries of the initial search region. Additional details and other examples of how motion estimation unit 44 may determine the reduced search region are discussed below with reference to FIGS. 6-8.

Motion compensation, performed by motion compensation unit 46, may involve fetching or generating the predictive block based on the motion vector determined by motion estimation unit 44. Again, motion estimation unit 44 and motion compensation unit 46 may be functionally integrated, in some examples. Upon receiving the motion vector for the PU of the current block, motion compensation unit 46 may locate the predictive block to which the motion vector points in one of the reference picture lists (RPLs). Summer 50 forms a residual video block by subtracting pixel values of the predictive block from the pixel values of the current block being coded, forming pixel difference values, as discussed below. In general, motion estimation unit 44 performs motion estimation relative to luma components, and motion compensation unit 46 uses motion vectors calculated based on the luma components for both chroma components and luma components. Prediction processing unit 42 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may determine an intra-prediction mode to use to encode a current block. In some examples, intra-prediction unit 48 may encode blocks using various intra-prediction modes, e.g., during separate encoding passes, and intra-prediction unit 48 may select an appropriate intra-prediction mode to use from a plurality of intra-prediction modes.

For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 48 may calculate ratios from the distortions and rates for the various encoded blocks to determine which intra-prediction mode exhibits the best rate-distortion value for the block.

In some examples, the plurality of intra-prediction modes available for use by intra-prediction unit 48 may include a planar prediction mode, a DC prediction mode, and one or more angular prediction modes. Regardless of the selected mode, intra-prediction unit 48 may always predict a current block based on reconstructed blocks adjacent to the current block. As one example, when using the planar prediction mode, intra-prediction unit 48 may predict a current block by averaging horizontal and vertical predictions. In some examples, intra-prediction unit 48 may determine the horizontal predictions based on a left neighboring block and a top-right neighboring block (as samples of the right neighboring block may not be reconstructed when predicting the current block) and determine the vertical predictions based on a top neighboring block and a bottom-left neighboring block (as samples of the bottom neighboring block may not be reconstructed when predicting the current block).

As another example, when using the DC prediction mode, intra-prediction unit 48 may predict samples of a current block with a constant value. In some examples, the constant value may represent an average of samples in the left-neighboring block and samples in the top neighboring block. As another example, when using one of the one or more angular prediction modes, intra-prediction unit 48 may predict samples of a current block based on samples from a neighboring block indicated by a prediction direction.

Video encoder 20 forms a residual video block by subtracting the prediction data from prediction processing unit 42 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization processing unit 58 and inverse transform processing unit 60 apply inverse quantization and inverse transformation, respectively, to reconstruct the residual block in the pixel domain, e.g., for later use as a reference block.

Motion compensation unit 46 may also apply one or more interpolation filters to the reference block to calculate sub-integer pixel values for use in motion estimation. Summer 62 adds the reconstructed residual block to the motion compensated prediction block produced by motion compensation unit 46 to produce a reconstructed video block for storage in reference picture memory 64. The reconstructed video block may be used by motion estimation unit 44 and motion compensation unit 46 as a reference block to inter-code a block in a subsequent video picture. In some examples, such as where the current picture is used as a reference picture to predict the current picture, motion compensation unit 46 and/or summer 62 may update the version of the current picture stored by reference picture memory 64 at regular intervals while coding the current picture. As one example, motion compensation unit 46 and/or summer 62 may update the version of the current picture stored by reference picture memory 64 after coding each block of the current picture. For instance, where the samples of the current block are stored in reference picture memory 64 as initialized values, motion compensation unit 46 and/or summer 62 may update the samples of the current of the current picture stored by reference picture memory 64 with the reconstructed samples for the current block.

A filtering unit (not shown) may perform a variety of filtering processes. For example, the filtering unit may perform deblocking. That is, the filtering unit may receive a plurality of reconstructed video blocks forming a slice or a frame of reconstructed video and filter block boundaries to remove blockiness artifacts from a slice or frame. In one example, the filtering unit evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

In some examples, motion compensation unit 46 and/or summer 62 may update the version of the current picture stored by reference picture memory 64 before the filtering performs the filtering (e.g., deblocking, adaptive loop filtering (ALF) and/or sample adaptive offset (SAO)) to the samples. For instance, the filtering unit may wait until the whole picture is coded before applying the filtering. In this way, motion estimation unit 44 may use the current picture as a reference before applying the filtering. In some examples, the filtering unit may perform the filtering as the version of the current picture stored by reference picture memory 64 is updated. For instance, the filtering unit may apply the filtering as each block is updated. In this way, motion estimation unit 44 may use the current picture as a reference after applying the filtering.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra prediction unit 48, motion compensation unit 46, or entropy encoding unit 56), it should be understood that one or more other units of video encoder 20 may also be responsible for carrying out such techniques.

In this way, video encoder 20 may be configured to implement one or more example techniques described in this disclosure. For example, video encoder 20 may be configured to code a block of video data in a current picture using a predictor block included in the current picture, i.e., in the same picture. Video encoder 20 may further be configured to output a bitstream that includes a syntax element indicative of whether or not a picture referring to a VPS/SPS/PPS may be present in a reference picture list of the picture itself, e.g., for the purpose of coding one or more blocks of the current picture using Intra BC. That is, when a block is coded using intra BC mode, video encoder 20 may (assuming the syntax element indicates that a current picture can be included in a reference picture list for itself) signal that a reference picture for the block is the picture including the block, e.g., using an index value into a reference picture list such that the index value corresponds to the picture itself. Video encoder 20 may include this index value in motion information of the block that is coded using intra BC mode. In some examples, the hardware architecture of video encoder 20 may or may not be specifically adapted for using a current picture as a reference picture to predict a current block of the current picture.

Figure 4:
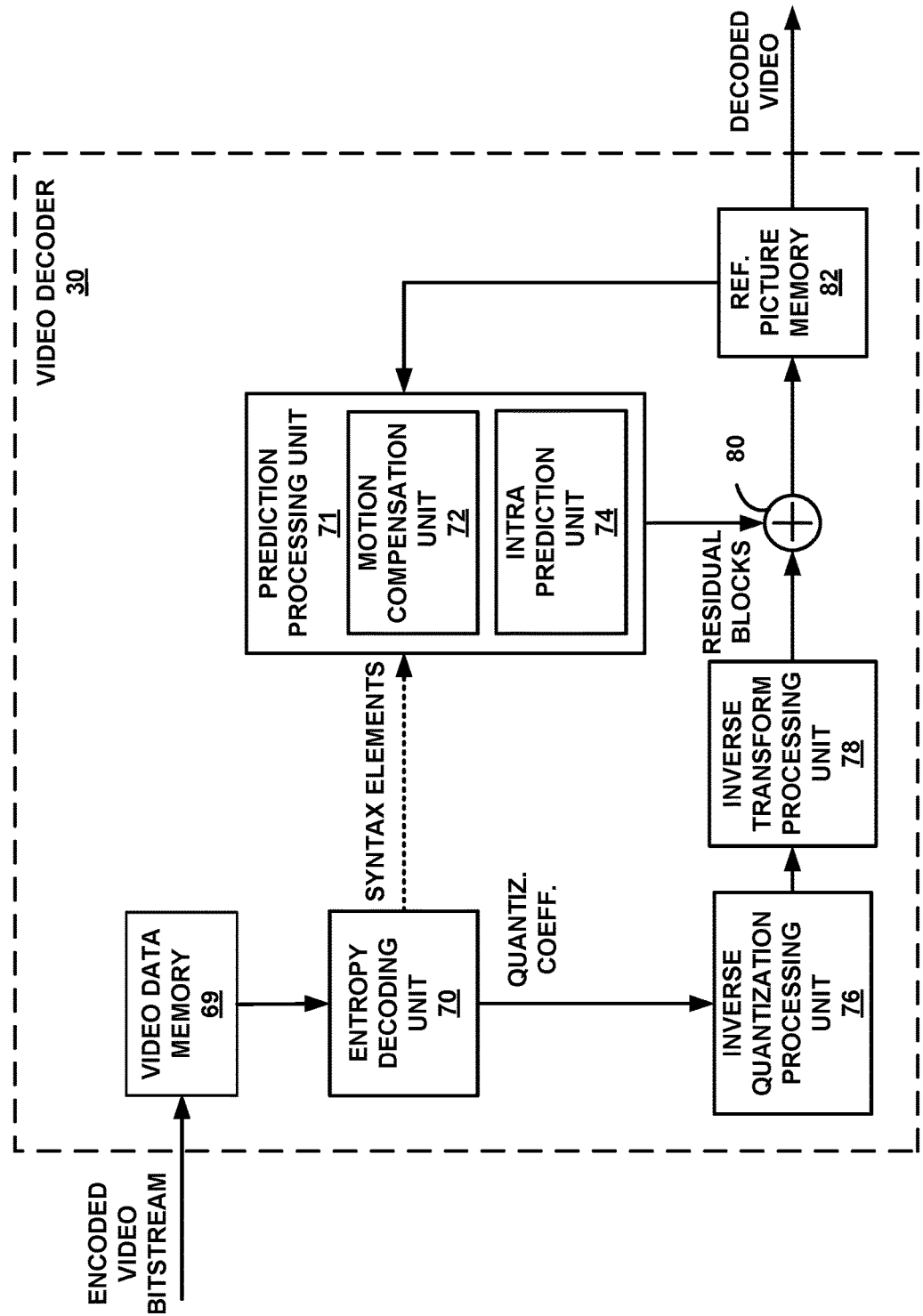
FIG. 4 is a block diagram illustrating an example of video decoder that may implement techniques described in this disclosure.

FIG. 4 is a block diagram illustrating an example of video decoder 30 that may implement techniques described in this disclosure. Again, the video decoder 30 will be described in the context of HEVC coding for purposes of illustration, but without limitation of this disclosure as to other coding standards. Moreover, video decoder 30 may be configured to implement techniques in accordance with the range extensions.

In the example of FIG. 4, video decoder 30 may include video data memory 69, entropy decoding unit 70, prediction processing unit 71, inverse quantization processing unit 76, inverse transform processing unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 3.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

In some examples, when the video slice is coded as an intra-coded (I) slice, intra prediction unit 74 may generate prediction data for a video block of the current video slice based on a signaled intra prediction mode and data from previously decoded blocks of the current picture. In some examples, when the video picture is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists (RPLs). Prediction processing unit 71 may construct the RPLs, e.g., List 0 and List 1, using construction techniques based on reference pictures stored in reference picture memory 82.

In some examples, as opposed to restricting inter-prediction to use other pictures as reference pictures, video decoder 30 may use a current picture as a reference picture to predict blocks of video data included in the current picture. For example, prediction processing unit 71 may store a version of a current picture in prediction processing unit 71. In some examples, prediction processing unit 71 may store an initialized version of the current frame with pixel values initialized to a fixed value. In some examples, the fixed value may be based on a bit depth of samples of the current picture. For instance, the fixed value may be 1<< (bitDepth−1). In some examples, prediction processing unit 71 may store the initialized version of the current picture before encoding any blocks of the current picture. By storing an initialized version of the current picture, prediction processing unit 71 may use predictive blocks that are not yet reconstructed. By contrast, if prediction processing unit 71 does not store an initialized version of the current picture, only blocks that are already reconstructed may be used as predictor blocks (i.e., to avoid a decoder/encoder mismatch).

As discussed above, prediction processing unit 71 may generate one or more RPLs for the current picture. For instance, prediction processing unit 71 may include the current picture an RPL for the current picture.

As discussed above, video decoder 30 may decode a block of video data of a current picture of video data based on a predictive block. In some examples, motion compensation unit 72 may select a block located in the current picture for use as a predictive block for the current block of the current picture. In particular, prediction processing unit 71 may construct, for a current block, an RPL that includes the current picture, motion compensation unit 72 may receive motion parameters for the current block indicating an index in the RPL. In some examples, the index may identify the current picture in the RPL. When this occurs, motion compensation unit 72 may use a motion vector included in the motion parameters to extract a predictor block from the current picture itself at a position identified by the motion vector relative to the current block. In this way, motion compensation unit 72 may perform Intra BC.

Prediction processing unit 71 may determine a motion vector that represents a displacement between the current block of video data and the predictor block of video data. In some examples, prediction processing unit 71 may determine the motion vector based on one or more syntax elements received in the encoded video bitstream. In some examples, prediction processing unit 71 may determine the motion vector with integer precision. In such examples, such as where the current picture is a marked as a long-term reference picture, prediction processing unit 71 may not use normal long-term reference pictures to predict the current picture (i.e., long-term reference pictures that are not the current picture).

In some examples, prediction processing unit 71 may determine the motion vector with different levels of precision. For instance, prediction processing unit 71 may determine the motion vector with integer precision, default precision, or finest motion precision (e.g., ¼ pel precision in HEVC). In some examples, prediction processing unit 71 may receive a syntax element that indicates the precision of the coded Intra BC motion vectors, e.g., in a SPS or VPS referred to by the current picture. In some examples, the precision of the Intra BC motion vectors may be adaptive at the picture level and prediction processing unit 71 may receive a syntax element that indicates the precision of the coded Intra BC motion vectors, e.g., in a PPS or slice referred to by the current block.

Motion compensation unit 72 determines prediction information for a video block of the current video slice by parsing the motion vectors and other syntax elements, and uses the prediction information to produce the predictive blocks for the current block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks. As one example, where the motion vector that indicates a predictor block has fractional-pixel resolution, motion compensation unit 72 may perform fractional-pixel interpolation to calculate interpolated values for sub-integer pixels of the predictor block. In some cases, in order to perform fractional-pixel interpolation to calculate interpolated values for sub-integer pixels of the predictor block, motion compensation unit 72 may need to reference sample pixel values from within the predictor block and from outside the predictor block. However, in some examples, it may not be possible for motion compensation unit 72 to reference sample pixel values from outside the predictor block.

In accordance with one or more techniques of this disclosure, motion compensation unit 72 may be able to reference sample pixel values from outside the predictor block because a search region from which the predictor block is selected may vary based on a resolution of the motion vector. As one example, when the motion vector has integer-pixel resolution, the search region for the current block may be an initial search region. As another example, when the motion vector has fractional-pixel resolution, the search region for the current block may be a reduced search region. In some examples, the reduced search region may be determined by reducing the initial search region by M samples from right and bottom boundaries of the initial search region, and reducing the initial search region by N samples from top and left boundaries of the initial search region. In some examples, when performing fractional-pixel interpolation to determine the pixel values of a predictor block, motion compensation unit 72 may reference sample pixel values from within the predictor block and sample pixel values from outside of the reduced search region but within the initial search region. However, as the sample pixel values are still included within the initial search region, motion compensation unit 72 may still be able to reference said sample pixel values.

Inverse quantization processing unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform processing unit 78 with the corresponding predictive blocks generated by motion compensation unit 72. Summer 80 represents the component or components that perform this summation operation.

Video decoder 30 may include a filtering unit, which may, in some examples, be configured similarly to the filtering unit of video encoder 20 described above. For example, the filtering unit may be configured to perform deblocking, SAO, or other filtering operations when decoding and reconstructing video data from an encoded bitstream.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

In this way, video decoder 30 may be configured to implement one or more example techniques described in this disclosure. For example, video decoder 30 may be configured to receive a bitstream that includes a syntax element indicative of whether or not a picture referring to a PPS may be present in a reference picture list of the picture itself, e.g., for the purpose of coding one or more blocks of the current picture using intra BC mode. That is, video decoder 30 may decode a value for the syntax element that indicates that a current picture can be included in a reference picture list for itself. Accordingly, when a block is coded using intra BC mode, video decoder 30 may determine that a reference picture for the block is the picture including the block, e.g., using an index value into a reference picture list such that the index value corresponds to the picture itself. Video decoder 30 may decode this index value from motion information of the block that is coded using intra BC mode. In some examples, the hardware architecture of video decoder 30 may not be specifically adapted for using a current picture as a reference picture to predict a current block of the current picture.

Figure 5:
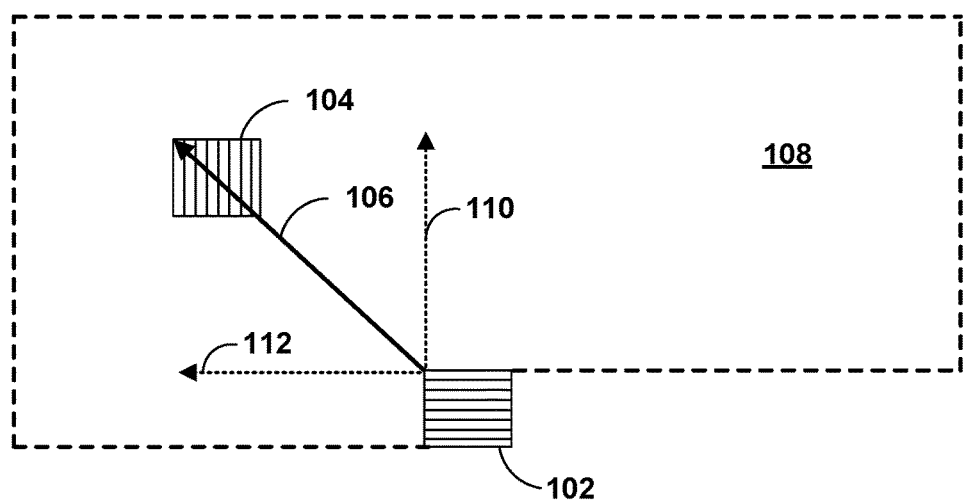
FIG. 5 is a diagram illustrating an example of an Intra Block Copying process, in accordance with one or more techniques of this disclosure.

FIG. 5 is a diagram illustrating an example of an Intra BC process, in accordance with one or more techniques of this disclosure. According to one example intra-prediction process, video encoder 20 may select, for a current block to be coded in a picture, a predictor video block, e.g., from a set of previously coded and reconstructed blocks of video data, in the same picture. In the example of FIG. 5, reconstructed region 108 includes the set of previously coded and reconstructed video blocks. The blocks in the reconstructed region 108 may represent blocks that have been decoded and reconstructed by video decoder 30 and stored in reconstructed region memory 92, or blocks that have been decoded and reconstructed in the reconstruction loop of video encoder 20 and stored in reconstructed region memory 64. Current block 102 represents a current block of video data to be coded. Predictor block 104 represents a reconstructed video block, in the same picture as current block 102, which is used for Intra BC prediction of current block 102.

In the example intra-prediction process, video encoder 20 may select predictor block 104 from within a search region. As discussed above and in accordance with one or more techniques of this disclosure, video encoder 20 may determine the search region based on a resolution to be used for a motion vector that indicates predictor block 104 (i.e., a resolution that will be used for motion vector 106). In the example of FIG. 5, based on determining that integer-pixel resolution will be used for motion vector 106, video encoder 20 may determine that the search region consists of reconstructed region 108 and select predictor block 104 from within reconstructed region 108. Video encoder 20 may then determine and encode motion vector 106, which indicates the position of predictor block 104 relative to current block 102, together with the residue signal. For instance, as illustrated by FIG. 5, motion vector 106 may indicate the position of the upper-left corner of predictor block 104 relative to the upper-left corner of current block 102. As discussed above, motion vector 106 may also be referred to as an offset vector, displacement vector, or block vector (BV). Video decoder 30 may utilize the encoded information for decoding the current block.

Video decoder 30 may decode, based on the RPL, a block of video data in the current picture. In particular, video decoder 30 may decode a block of video data based on a predictor block included in the version of the current picture stored in reference picture memory 82. In other words, when decoding a block of the current picture, video decoder 30 may predict the block from the current picture, namely the reference with reference index IdxCur (in ListX). Video decoder 30 may write the reconstructed samples of the block to the current picture buffer (e.g., reference picture memory 82) to replace the initialized values (e.g., after the video decoder has finished decoding the block). Note that in this example, video decoder 30 does not apply deblocking, SAO or any other filtering operation to the reconstructed samples after decoding the block. In other words, video decoder 30 may use the current picture as a reference before applying deblocking and SAO. After coding the whole picture, video decoder 30 may apply deblocking, SAO and other operations such as reference picture marking in the same way as those described in HEVC version 1.

Figure 6A:
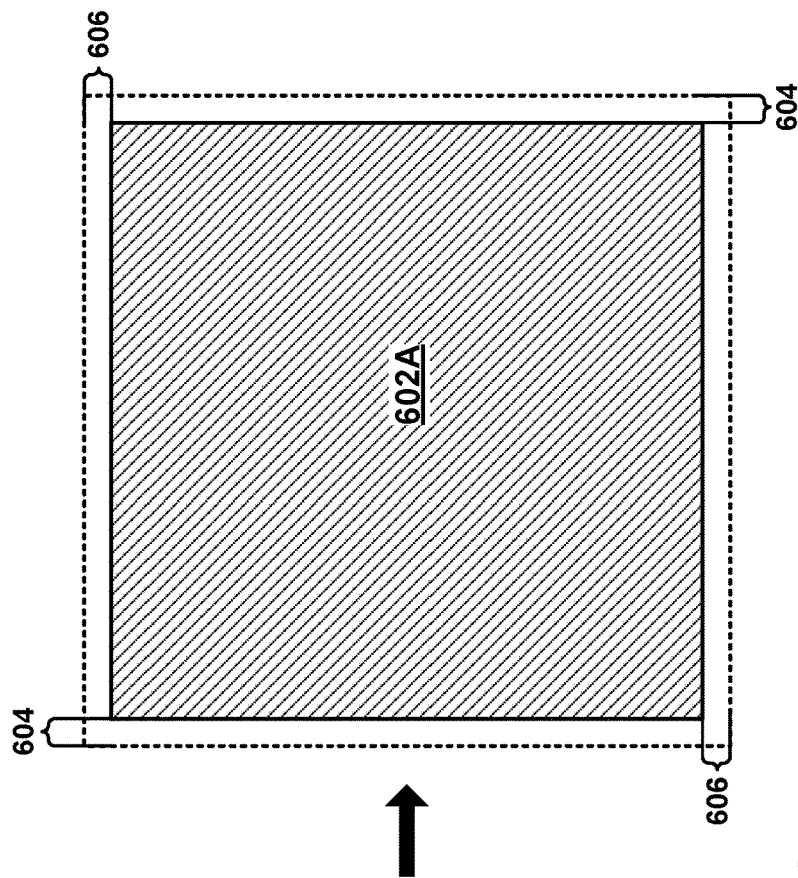
Figure 6A:
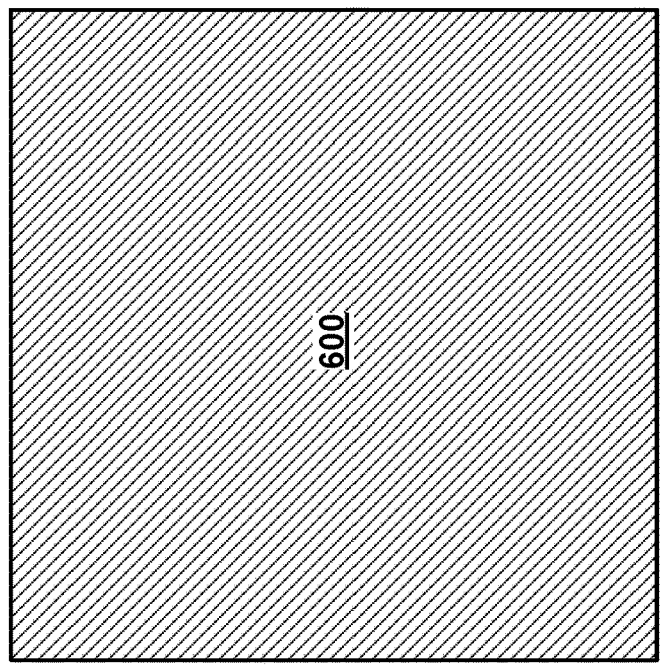

FIGS. 6A and 6B are diagrams illustrating example search regions from which a predictor block may be selected, in accordance with one or more techniques of this disclosure. As shown in FIG. 6, video encoder 20 may determine search region 600 that represents the available search region for Intra BC in the current SCC Draft (e.g., the causal or reconstructed region). In accordance with the techniques of this disclosure, video encoder 20 may determine a reduced search region. For instance, in response to determining that a motion vector used to identify a predictor block will have fractional-pixel resolution, video encoder 20 may determine reduced search region 602 (e.g., reduced search region 602A in FIG. 6A or reduced search region 602B in FIG. 6B). In the example of FIG. 6A, video encoder 20 may determine reduced search region 602A by shrinking search region 600 by distance 604 in the horizontal direction and distance 606 in the vertical direction. In the example of FIG. 6B, video encoder 20 may determine reduced search region 602B by shrinking search region 600 by distance 604 in the horizontal direction. Distance 604 may be N samples and N may be dependent on a number of filter taps used for luma/chroma interpolation (e.g., a number of taps used by video encoder 20 and/or video decoder 30 during a fractional-pixel interpolation process). Distance 606 may be M samples and M may be dependent on the number of filter taps used for luma/chroma interpolation. In some examples, N may equal M. In other examples, N and M may be different.

In some examples, video encoder 20 may determine the reduced search region based on a sampling ratio. As one example, video encoder 20 may use reduced search region 602A for all chroma sampling ratios. As another example, video encoder 20 may use reduced search region 602A for all chroma sampling ratios except 4:0:0 and 4:4:4. As another example, video encoder 20 may use reduced search region 602A for 4:2:0 chroma sampling ratios and use reduced search region 602B for 4:2:2 chroma sampling ratios. As can be seen in FIGS. 6A and 6B, reduced search region 602B differs from 602A in that it is only shrunk in the horizontal direction.

Figure 7:
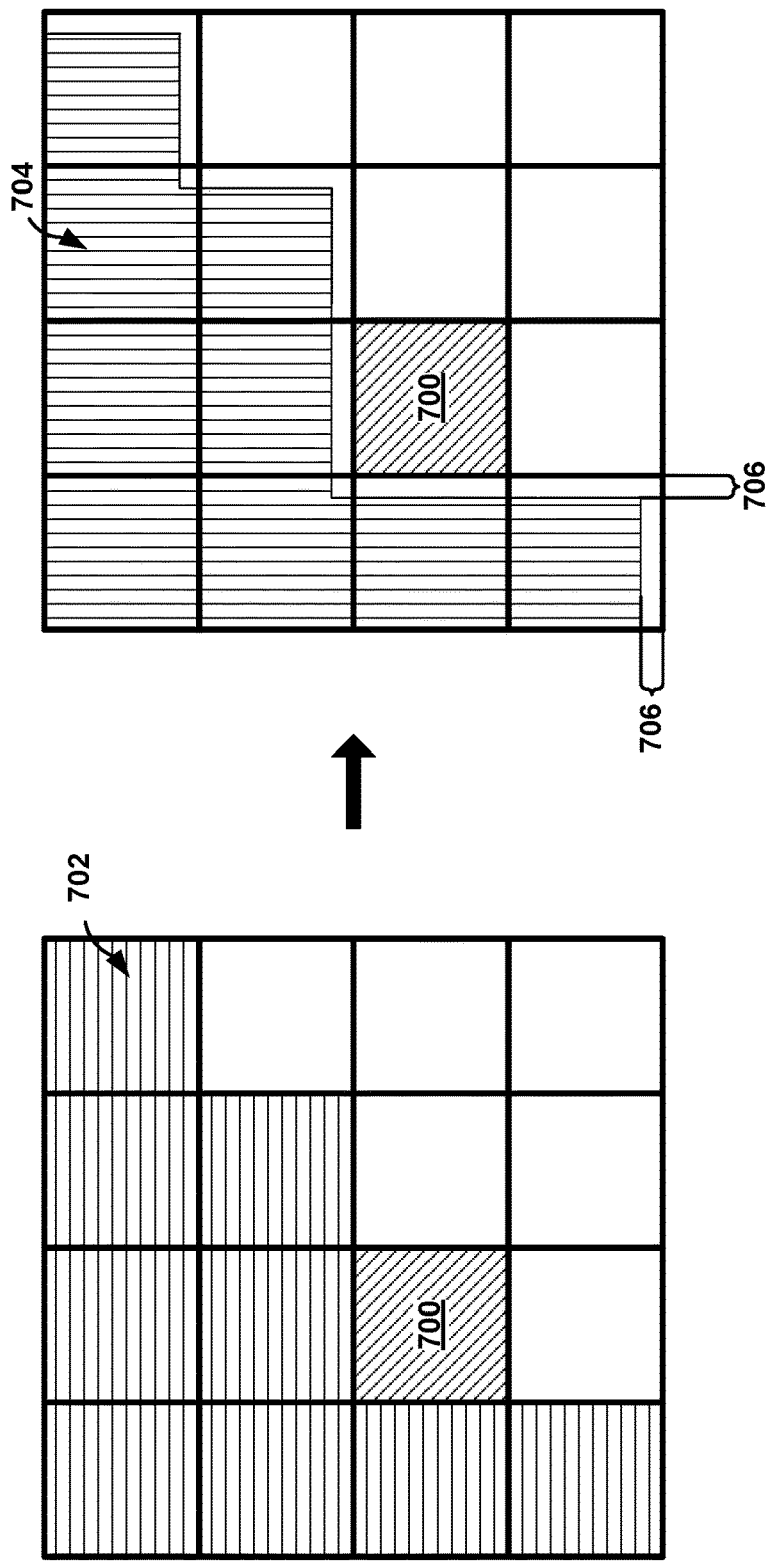
FIG. 7 is a diagram illustrating example search regions from which a predictor block may be selected, in accordance with one or more techniques of this disclosure.

FIG. 7 is a diagram illustrating example search regions from which a predictor block may be selected, in accordance with one or more techniques of this disclosure. As shown in FIG. 7, video encoder 20 may determine search region 702 (shaded with vertical lines) that represents the available search region for Intra BC in the current SCC (e.g., the causal or reconstructed region). In accordance with the techniques of this disclosure, video encoder 20 may determine a reduced search region by offsetting one or more boundaries of the initial search region by a number of samples. For instance, in response to determining that a motion vector used to identify a predictor block will have fractional-pixel resolution, video encoder 20 may determine reduced search region 704 (shaded with horizontal lines) by shrinking bottom and right boundaries of search region 702 by distance 706. Distance 706 may be N samples and N may be dependent on the number of filter taps used for luma/chroma interpolation.

In some examples, in addition to offsetting the bottom and right boundaries of the initial search region (i.e., search region 702), video encoder 20 may offset the initial search region at any boundary of the initial search region, including slice boundaries, tile boundaries.

In any case, video encoder 20 may select a predictor block for current block 700 from the determined search region. As one example, where the motion vector that indicates the predictor block will have integer-pixel resolution, video encoder 20 may select a predictor block for current block 700 from search region 702. As another example, where the motion vector that indicates the predictor block will have fractional-pixel resolution, video encoder 20 may select a predictor block for current block 700 from reduced search region 704.

Figure 8:
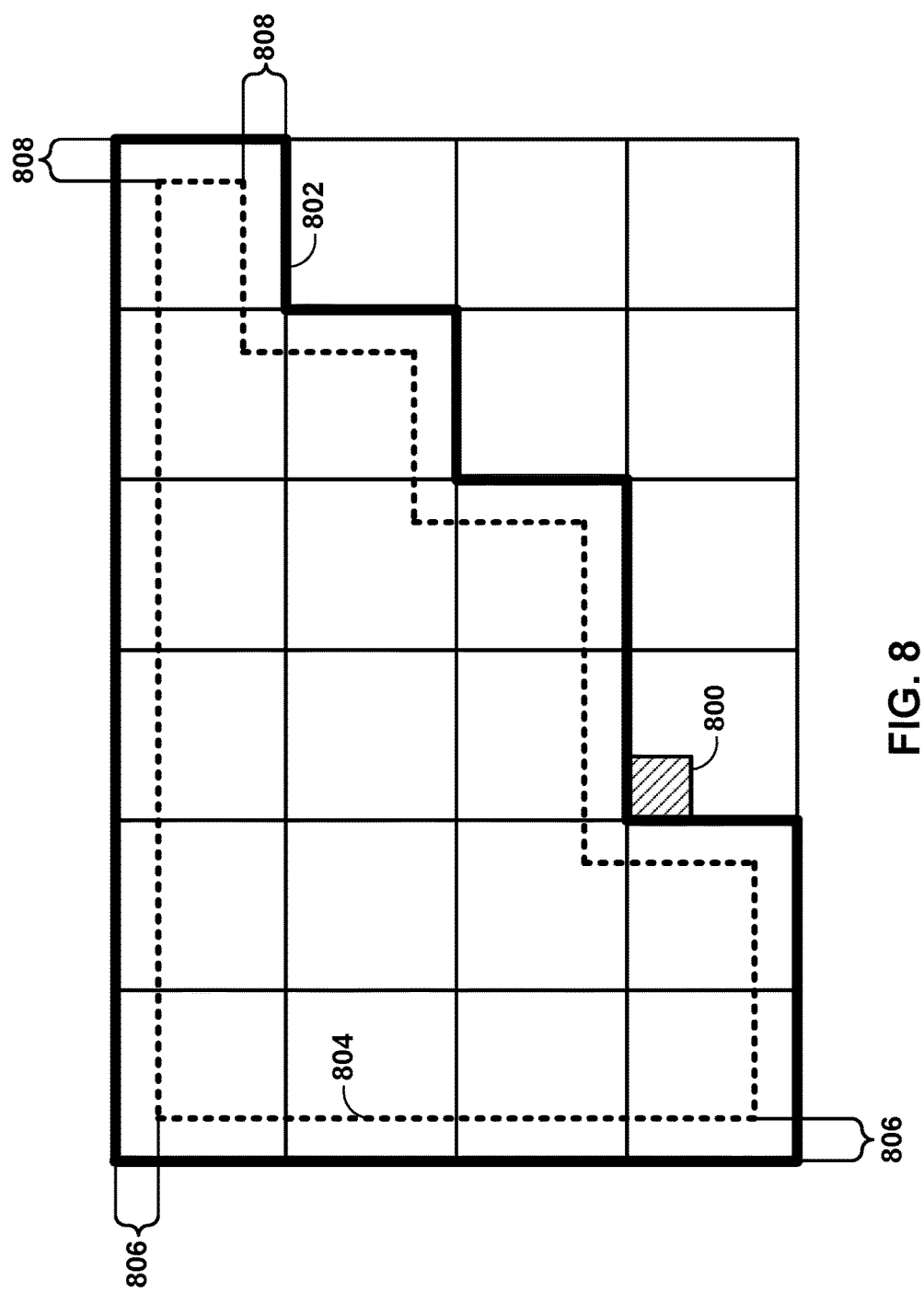
FIG. 8 is a diagram illustrating example search regions from which a predictor block may be selected, in accordance with one or more techniques of this disclosure.

FIG. 8 is a diagram illustrating example search regions from which a predictor block may be selected, in accordance with one or more techniques of this disclosure. As shown in FIG. 8, video encoder 20 may determine an initial search region 802 (bounded the heavy line) that represents the available search region for Intra BC in the current SCC (e.g., the causal or reconstructed region). In accordance with the techniques of this disclosure, video encoder 20 may determine a reduced search region by offsetting one or more boundaries of the initial search region (e.g., by removing pixels of blocks in a specified margin of an initial search region from consideration in the search). For instance, video encoder 20 may determine reduced search region 804 (bounded by the dashed line) by shrinking top and left boundaries of search region 802 by distance 806 and shrinking bottom and right boundaries of search region 802 by distance 808. Distance 806 may be N samples (e.g., 1, 2, 3, 4, 5, 6, 7, 8) and N may be dependent on the number of filter taps used for luma/chroma interpolation. Distance 808 may be M samples (e.g., 1, 2, 3, 4, 5, 6, 7, 8) and M may be dependent on the number of filter taps used for luma/chroma interpolation. For example, M may correspondingly increase with the number of filter taps. In some examples, N may equal M. In other examples, N and M may be different. In one specific example, N and M may be two samples.

In some examples, in addition to offsetting the top, bottom, left, and right boundaries of the initial search region (i.e., search region 802), video encoder 20 may offset the initial search region at any boundary of the initial search region, including slice boundaries, tile boundaries.

In any case, video encoder 20 may select a predictor block for current block 800 from the determined search region. As one example, where the motion vector that indicates the predictor block will have integer-pixel resolution (i.e., that chroma interpolation will be required), video encoder 20 may select a predictor block for current block 800 from search region 802. As another example, where the motion vector that indicates the predictor block will have fractional-pixel resolution, video encoder 20 may select a predictor block for current block 800 from reduced search region 804.

The following is an example implementation of the technique of FIG. 8. Additions to previous example implementations are shown with underline. Deletions to previous example implementations are shown with italics.

General Example 8.5.3.2.1 General

Constraint for Top and Left Boundary of IBC Reference Region

It is a requirement of bitstream conformance that when the reference picture is the current picture, the luma motion vector mvLX shall obey the following constraints:
The variables xRef and yRef are derived as follows:
When ChromaArrayType is not equal to 0 and mvCLX[0]& 0x7 is not equal to 0
xRef=(xPb+(mvLX[0]>>2)−IntSamplesX) where IntSamplesX can take values 0, 1, 2, 3 . . . .
Otherwise
xRef=(xPb+(mvLX[0]>>2))
When ChromaArrayType is not equal to 0 and mvCLX[0]& 0x7 is not equal to 0 where IntSamplesX can take values 1, 2, 3, 4 . . . .
xRef=(xPb+(mvLX[1]>>2)−IntSamplesY) where IntSamplesY can take values 0, 1, 2 . . . N
Otherwise
xRef=(xPb+(mvLX[1]>>2))
When the derivation process for z-scan order block availability as specified in clause 6.4.1 of SCC WD 6 is invoked with (xCurr,yCurr) set equal to (xCb,yCb) and the neighbouring luma location (xNbY,yNbY) set equal to (xPb+(mvLX[0]>>2), (yPb+mvLX[1]>>2))(xRef, yRef) as inputs, the output shall be equal to TRUE.
Constraint for Bottom and Right boundary of IBC reference region
The variables xRef and yRef are derived as follows:
When ChromaArrayType is not equal to 0 and mvCLX[0] & 0x7 is not equal to 0
xRef=(xPb+(mvLX[0]>>2)+nPbW−1+IntSamplesX) where IntSamplesX can take values 0, 1, 2, 3 . . . .
Otherwise
xRef=(xPb+(mvLX[0]>>2)+nPbW−1)
When ChromaArrayType is not equal to 0 and mvCLX[1] & 0x7 is not equal to 0 where IntSamplesX can take values 1, 2, 3, 4 . . . .
xRef=(xPb+(mvLX[1]>>2) nPbH−1+IntSamplesY) where IntSamplesY can take values 0, 1, 2 . . . N
Otherwise
xRef=(xPb+(mvLX[1]>>2)+nPbH−1)
When the derivation process for z-scan order block availability as specified in clause 64.1 is invoked with (xCurr,yCurr) set equal to (xCb,yCb) and the neighbouring luma location (xNbY,yNbY) set equal to (xPb+

(mvLX[0]>>2)+nPbW−1, yPb+(mvLX[1]>>2)+nPbH−1)(xRef,yRef) as inputs, the output shall be equal to TRUE.

One or both the following conditions shall be true:
When ChromaArrayType is not equal to 0 and mvCLX[0] & 0x7 is not equal to 0
  The value of (mvLX[0]>>2)+nPbW+IntSamplesX)+xB1 is less than or equal to 0, where IntSamplesX can take values 0, 1, 2, 3 . . . .
  Otherwise
  The value of (mvLX[0]>>2)+nPbW+xB1 is less than or equal to 0.
When ChromaArrayType is not equal to 0 and mvCLX[0] & 0x7 is not equal to 0
  The value of (mvLX[1]>>2)+nPbH+IntSamplesY)+yB1 is less than or equal to 0. where IntSamplesY can take values 0, 1, 2, 3 . . . .
  Otherwise
  The value of (mvLX[0]>>2)+nPbH+xB1 is less than or equal to 0.
The following condition shall be true:
  (xPb+(mvLX[0]>>2)+nPbSw−1)xRef/CtbSizeY−xCurr/CtbSizeY<=yCurr/CtbSizeY−(yPb+(mvLX[1]>>2)+nPbSh−1)yRef/CtbSizeY The following is another example implementation of the technique of FIG. 8. Additions to the SCM 4.0 software are shown with underline. Deletions to the SCM 4.0 software are shown with italics.

8.5.3.2.1 General

Constraint for Top and Left Boundary of IBC Reference Region

It is a requirement of bitstream conformance that when the reference picture is the current picture, the luma motion vector mvLX shall obey the following constraints:
The variables xRef and yRef are derived as follows:
When ChromaArrayType is not equal to 0 and mvCLX[0]& 0x7 is not equal to 0
  xRef=(xPb+(mvLX[0]>>2)−2) where IntSamplesX can take values 0, 1, 2, 3 . . . .
  Otherwise
  xRef=(xPb+(mvLX[0]>>2))
When ChromaArrayType is not equal to 0 and mvCLX[1]& 0x7 is not equal to 0 where IntSamplesX can take values 1, 2, 3, 4 . . . .
  xRef=(xPb+(mvLX[1]>>2)−2) where IntSamplesY can take values 0, 1, 2 . . . N
  Otherwise
  xRef=(xPb+(mvLX[1]>>2))
When the derivation process for z-scan order block availability as specified in clause 6.4.1 is invoked with (xCurr,yCurr) set equal to (xCb,yCb) and the neighbouring luma location (xNbY,yNbY) set equal to (xPb+(mvLX[0]>>2), (yPb+mvLX[1]>>2))(xRef, yRef) as inputs, the output shall be equal to TRUE.

Constraint for Bottom and Right Boundary of IBC Reference Region

The variables xRef and yRef are derived as follows:
When ChromaArrayType is not equal to 0 and mvCLX[0]& 0x7 is not equal to 0
  xRef=(xPb+(mvLX[0]>>2)+nPbW−1+2) where IntSamplesX can take values 0, 1, 2, 3 . . . .
  Otherwise
  xRef=(xPb+(mvLX[0]>>2)+nPbW−1)
When ChromaArrayType is not equal to 0 and mvCLX[1]& 0x7 is not equal to 0 where IntSamplesX can take values 1, 2, 3, 4 . . . .
  xRef=(xPb+(mvLX[1]>>2) nPbH−1+2) where IntSamplesY can take values 0, 1, 2 . . . N
  Otherwise
  xRef=(xPb+(mvLX[1]>>2)+nPbH−1)
When the derivation process for z-scan order block availability as specified in clause 6.4.1 is invoked with (xCurr,yCurr) set equal to (xCb,yCb) and the neighbouring luma location (xNbY,yNbY) set equal to (xPb+(mvLX[0]>>2)+nPbW−1, yPb+(mvLX[1]>>2)+nPbH−1)(xRef, yRef) as inputs, the output shall be equal to TRUE.

One or both the following conditions shall be true:
When ChromaArrayType is not equal to 0 and mvCLX[0] & 0x7 is not equal to 0
  The value of (mvLX[0]>>2)+nPbW+2)+xB1 is less than or equal to 0, where IntSamplesX can take values 0, 1, 2, 3 . . . .
  Otherwise
  The value of (mvLX[0]>>2)+nPbW+xB1 is less than or equal to 0.
When ChromaArrayType is not equal to 0 and mvCLX[0] & 0x7 is not equal to 0
  The value of (mvLX[1]>>2)+nPbH+2)+yB1 is less than or equal to 0. where IntSamplesY can take values 0, 1, 2, 3 . . . .
  Otherwise
  The value of (mvLX[0]>>2)+nPbH+xB1 is less than or equal to 0.
The following condition shall be true:
  (xPb+(mvLX[0]>>2)+nPbSw−1)xRef/CtbSizeY−xCurr/CtbSizeY<=yCurr/CtbSizeY−(yPb+(mvLX[1]>>2)+nPbSh−1)yRef/CtbSizeY As discussed above, the techniques of this disclosure address the issue when the luma MV, or the chroma MV, or both luma and chroma MV are represented with fractional-pixel resolution (e.g., quarter-pixel resolution). As discussed above, when an MV points to a fractional-pixel position, the prediction pixels are obtained using interpolation filters for luma/chroma. The interpolation filter may require additional neighboring samples outside the prediction block. As such, these pixels/samples that are used for interpolation process need to meet the Intra BC constraints for the reference block as described above. To realize the above constraints, some techniques are proposed below that can be applied separately or jointly in combination with other techniques described herein.

As one example, the reference region may be restricted based on the current blocks MV. In other words, a particular motion vector (luma/chroma) may be disallowed when the reference block with interpolation samples does not meet the Intra BC constraint as described above. As another example, a particular motion vector (luma/chroma) may be disallowed when the reference block with interpolation samples (four samples each side) does not meet the Intra BC constraint as described above. As another example, the current IBC search region may be reduced by a number of samples, e.g., two samples, (in all four sides of the valid IBC region) when the motion vector corresponding to the block uses chroma interpolation. As another example, the current IBC search region may be reduced by one sample to the left and top picture boundary and two samples to the right and bottom IBC reference region when the motion vector corresponding to the block uses chroma interpolation. As another example, the current IBC search region may be reduced by two samples to the left and top picture boundary and four samples to the right and bottom IBC reference region when the motion vector corresponding to the block uses chroma interpolation. In general, as discussed above with reference to FIG. 8, the valid IBC reference region that satisfies the constraints described above may be reduced by N samples to the Top and left boundary and M samples to the right and bottom boundary. In some examples, the above-described constraints are not applied for a monochrome profile.

Figure 9:
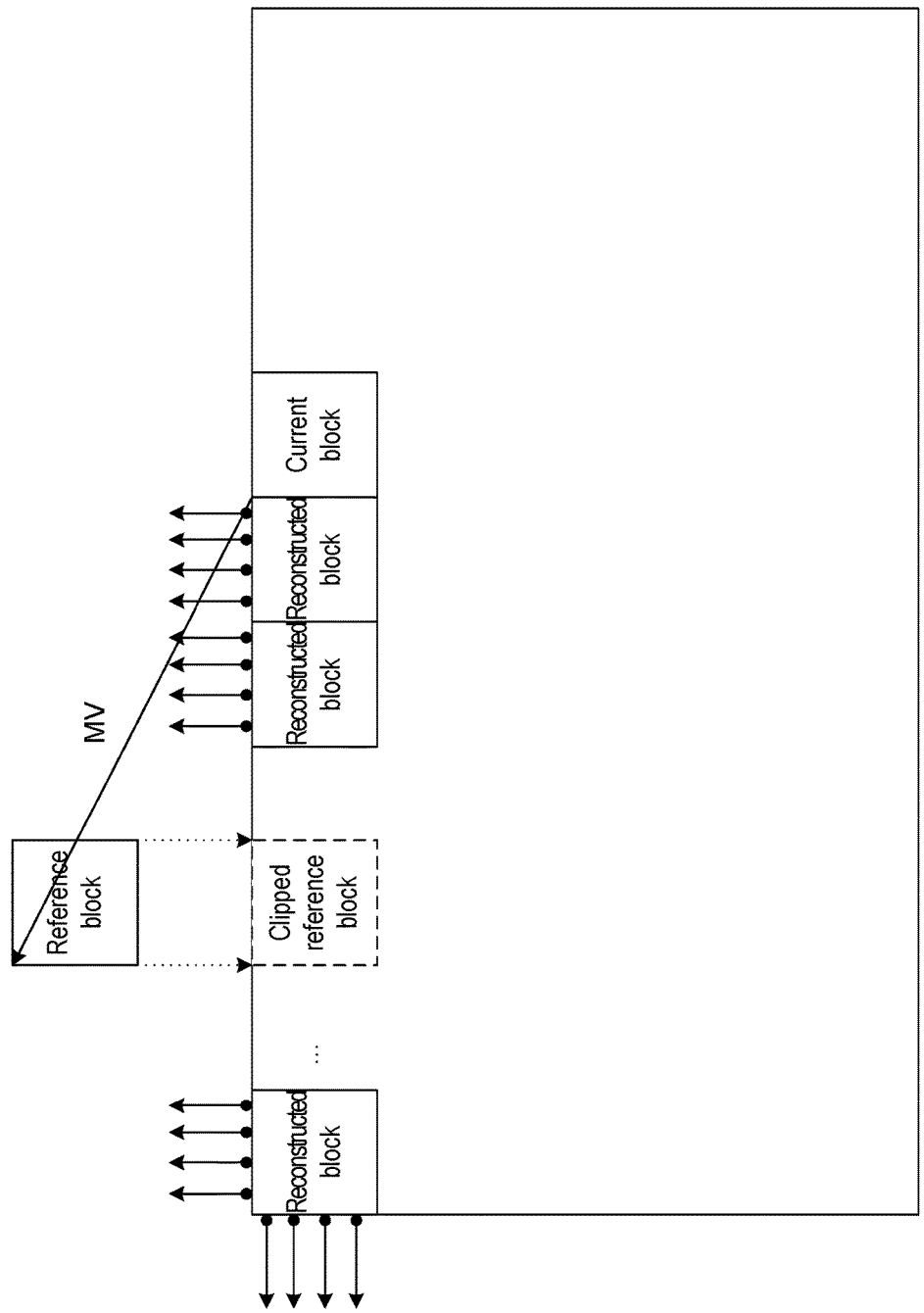
FIG. 9 is a diagram illustrating an example technique for padding a region located outside of a picture, in accordance with one or more techniques of this disclosure.

FIG. 9 is a diagram illustrating an example technique for padding a region located outside of a picture, in accordance with one or more techniques of this disclosure. In RExt WD 7, the Intra BC reference region is restricted to be completely inside the current picture. Due to this restriction, the offset described above (e.g., reduction of the reference region by N samples) may be applied to avoid exceeding the picture boundaries.

However, in some examples, the search region (i.e., the Intra BC reference region) may include the pixels located outside the picture boundary similarly to what is done for regular inter mode, where sample values in the search region outside of the picture are derived by copying the closest pixel within the picture boundary to the needed outside sample (padding process).

In a similar way, when the block next to the picture boundary located inside the picture was already reconstructed, a video coder (e.g., video encoder 20 and/or video decoder 30) may apply the padding process to extend the boundary pixels to the outer space (i.e., to generate pixel values for pixels located outside of the picture boundary) as shown in FIG. 9 with arrows.

For example, to check whether the outside or partially outside block is available as Intra BC reference, a video coder may clip the coordinates of the reference block corners, such as top-left corner, top-right corner, bottom-left corner, and/or bottom-right corner, to the picture boundary (e.g. horizontal coordinate may be clipped to be within 0 and picture width minus 1, and vertical coordinate may be clipped to be within 0 and picture height minus 1). The video coder may perform the validity check to such clipped block, shown in FIG. 9 as a dashed boundary block, or check whether clipped corner coordinates of the reference block are already reconstructed, i.e., can be used as IBC prediction for the reference block located outside or partially located outside of the picture.

For example, a video coder may clip the top left corner horizontal and vertical coordinates to the picture boundary as mentioned earlier, i.e., reference block is moved to have a top left corner at the clipped point. After the clipping, there could be two possibilities: the reference block is located inside the picture, or still located outside of the picture or partially located outside of the picture. If a reference block is located outside of the picture, the video coder may move the block horizontally into the picture by the distance of how much the horizontal coordinate of the bottom right corner of the block is extended to outside of the picture. This process, roughly, can be seen as moving the reference block into the picture in vertical direction first, following the block translation in the horizontal direction. Alternatively, the process can be vice versa and the video coder may move the bottom right corner horizontally first, followed by the move in the vertical direction.

In some examples, such as where the reference block is located outside or partially outside of the current picture, a video coder may consider clipped reference block corners and reference block width and height to determine whether the picture boundary pixels are reconstructed and available to be used for Intra BC prediction.

In some examples, a video coder may apply an offset to the extended reference region as discussed above to allow interpolation. For example, the reference block located in the outside space right above the current block is not yet available. As a result, pixels located in such region cannot be used for the interpolation, for example, for the reference block located close to the described unavailable part. So, the video coder may apply an offset of N pixels to shrink inside the available region to make interpolation possible. Alternatively, as opposed to applying the offset, the video coder may pad the nearest available pixels.

In RExt WD 7, Intra BC reference region is restricted within a region as shown by shaded region 702 of FIG. 7 (but not including block 700). As per RExt WD 7, the interpolation samples in FIG. 7 are zero in RExt WD 7 and N is equal to block width.

In RExt WD 7, portions of the IBC reference region is marked as unavailable when a) The reference region is outside the picture/slice/tile boundary.

b) The reference region is outside the parallel processing sample boundary as defined below:

$$(xPb+(mvLX[0]>>2)+nPbSw-1)/CtbSizeY-xCurr/CtbSizeY<=yCurr/CtbSizeY-(yPb+(mvLX[1]>>2)+nPbSh-1)/CtbSizeY$$

c) The reference region overlaps with the current coding unit.

d) The reference region overlaps with the region that is not available for reference (e.g., the reference region falls within a constrained intra predicted region). The block availability derivation is detailed in clause 6.4.1 in RExt WD 7.

The above constraints are specified in RExt WD 7 in the form of encoder conformance restrictions that is, an encoder that is capable of generating SCC bitstreams shall adhere to above reference region restrictions.

However, the techniques specified in RExt WD 7 may present one or more problems, which may not be desirable. As one example, the encoder side restrictions specified in RExt WD 7 may be potentially dangerous. For instance, the decoder behavior may be undefined when a non-compliant encoder does not follow these restrictions. As another example, the encoder restrictions specified in RExt WD 7 may not be aligned with the inter decoding process where, instead of restricting, the temporal reference region is clipped to a valid area in the decoder when the bitstream references out-of bound regions. As another example, restricting the reference region may have coding efficiency degradation in some scenarios. For instance, in the scenario when the majority of the prediction block falls within the valid region, it may be beneficial to clip the rest of the block to within the valid region instead of restricting the entire prediction block.

This disclosure proposes several techniques which may address the above problems. Below techniques can be applied independently or jointly in combination with other techniques of this disclosure. As used below, the term reference region may correspond to a sample, or set of samples within a prediction blocks.

In accordance with one or more techniques of this disclosure, the IBC reference region may be clipped to valid area in the decoder when the bitstream references out-of bound regions. In some examples, the clipping may be applied in one or more of the following scenarios. As one example, a video coder (i.e., a video encoder or video decoder) may apply clipping when the reference region is outside the picture boundary. As another example, a video coder may apply clipping when the reference region overlaps with the current coding unit. As another example, a video coder may apply clipping when the reference region is outside the parallel processing sample boundary as defined in the following equation:

$$(xPb+(mvLX[0]>>2)+nPbSw-1)/CtbSizeY-xCurr/CtbSizeY<=yCurr/CtbSizeY-(yPb+(mvLX[1]>>2)+nPbSh-1)/CtbSizeY$$

In some examples, padding may be applied in one or more of the following scenarios. As one example, a video coder may apply padding when the reference region is outside the slice boundary. As another example, a video coder may apply padding when the reference region is outside the tile boundary. As another example, a video coder may apply padding when the reference region overlaps with the region that is not available for reference (e.g., the reference region falls within a constrained intra predicted region). The video coder may determine whether a region is available using the technique described in clause 6.4.1 in REx WD 7.

In some examples, the padding process may be applied as follows. The video coder may set the value of each element in the sample array $S_L$ for the prediction block equal to $1<<(BitDepth_Y-1)$. When ChromaArrayType is not equal to 0, the video coder may set the value of each element in the sample arrays $S_{Cb}$ and $S_{Cr}$ for the picture equal to $1<<(BitDepth_C-1)$. The video coder may set the prediction mode CuPredMode[x][y] equal to MODE INTRA for each element in the prediction block.

The above proposed techniques can be applied at different granularity levels (e.g., sample level or prediction block level) that may result in different reference prediction blocks.

In accordance with one or more techniques of this disclosure, a video coder may clip the prediction block such that all of the samples within the prediction block fall in the valid reference region. For example, a video coder may clip the prediction block such that all the samples within the prediction block are within the picture boundary, all the samples within the prediction block do not overlap with the current coding unit, and all the samples within the prediction block are within the parallel processing sample boundary as defined in the following equation:

$$(xPb+(mvLX[0]>>2)+nPbSw-1)/CtbSizeY-xCurr/CtbSizeY<=yCurr/CtbSizeY-(yPb+(mvLX[1]>>2)+nPbSh-1)/CtbSizeY$$

The techniques of this disclosure may be implemented in a number of ways. Below is but one example implementation of one or more of the proposed techniques:

In this example, let the positions $(xA_{i,j}, yA_{i,j})$ represent the bottom-right sample location of the current luma prediction block relative to the top-left luma sample of the current picture at full-sample locations inside the given two-dimensional array when $refPicLX_L=CurrPic$ of luma samples.

$$yA_{i,j}=\text{Clip3}(\text{samples}_{Inter},(CtbY_{curr}+1)<<Ctb\ Log\ 2SizeY-\text{samples}_{Inter}, yInt_L+j)$$

When $CtbY_{curr}==CtbY_{Pred}\&\&CtbX_{curr}>=CtbX_{Pred}$ (that is in same CTU row)

$$xA_{i,j}=\text{Clip3}(\text{samples}_{Inter},(xA_{i,j}-(nPbW<<1)-xB1-1-\text{samples}_{Inter}, xInt_L+i)$$

Otherwise, $$xA_{i,j}=\text{Clip3}(\text{samples}_{Inter},((CtbY_{Curr}-CtbY_{Pred}+1))<<Ctb\ Log\ 2SizeY)+xCurr_{ctb}-nPbW-xB1-1-\text{samples}_{Inter}, xInt_L+1)$$

In the above equations, nPbW and nPbH respectively specify the width and the height of the luma prediction block, $CtbY_{Curr}=yCurr>>Ctb\ Log\ 2SizeY$, $CtbY_{Pred}=(yA_{i,j})>>Ctb\ Log\ 2SizeY$, $CtbX_{curr}=xCurr>>Ctb\ Log\ 2SizeY$, $xCurr_{ctb}=(CtbX_{curr})<<Ctb\ Log\ 2SizeY$, xB1 is the luma location of the top-left sample of the current luma prediction block relative to the top-left sample of the current luma coding block, and $\text{samples}_{Inter}$ corresponds to maximum interpolations samples used for luma or chroma samples.

Figure 10:
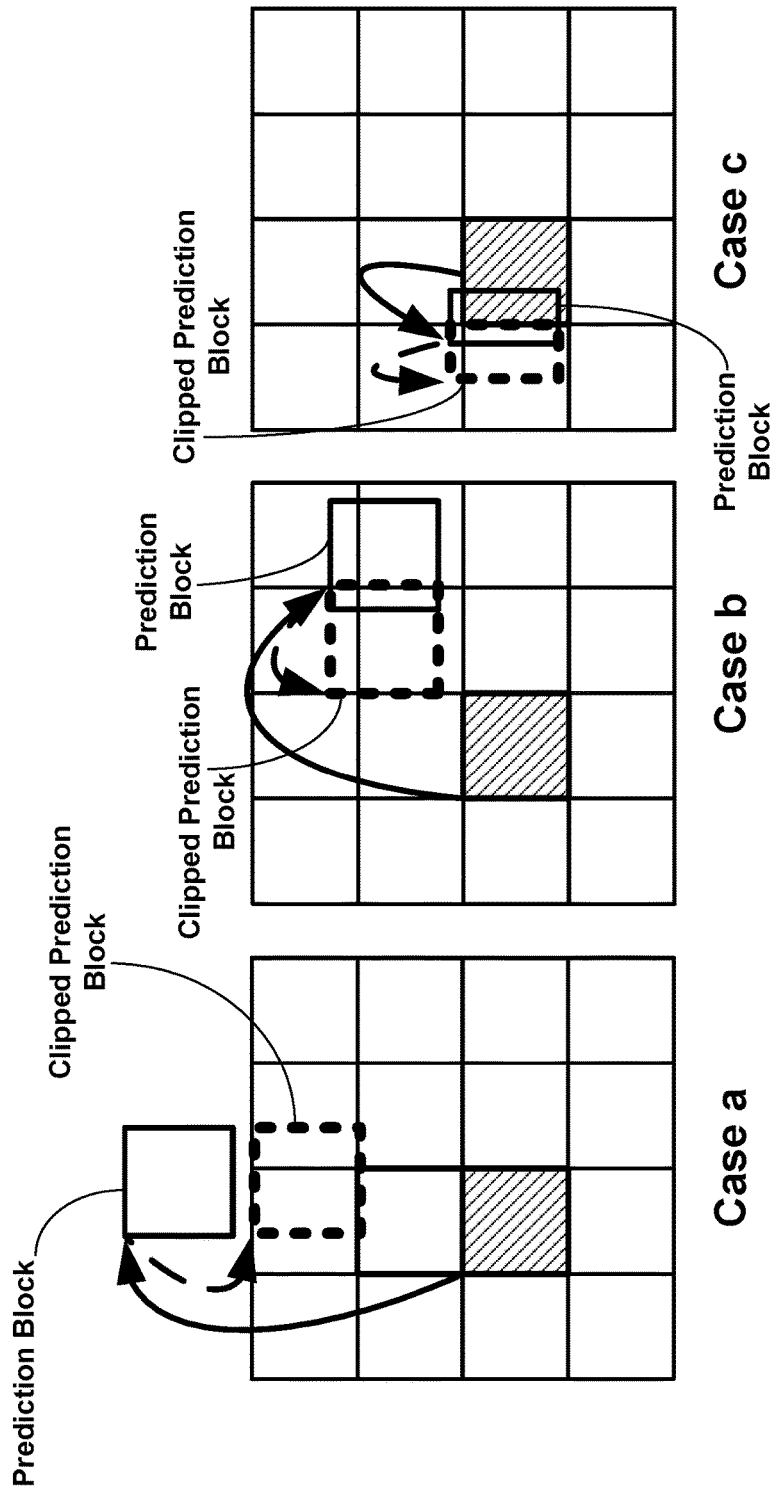
FIG. 10 illustrates some example scenarios of a clipping operation, in accordance with one or more techniques of this disclosure.

FIG. 10 illustrates some examples scenarios of the above clipping operation, in accordance with one or more techniques of this disclosure. In the scenarios/cases of FIG. 10, the prediction blocks are shown with a solid border and the clipped prediction blocks are shown with a dashed border. As shown in FIG. 10, it may be observed that the entire reference block (i.e., prediction block) may be clipped within the valid reference region and no padding may be necessary in these scenarios.

In accordance with one or more techniques of this disclosure, a video coder may clip each reference sample such that the each prediction sample falls in the valid reference region. For instance, the video coder may clip the reference samples such that the samples within the reference block fall within the valid reference region. For example, the video coder may clip the prediction block such that: samples within the prediction block are within the picture boundary, samples within the prediction block do not overlap with the current coding unit, and samples within the prediction block are within the parallel processing sample boundary as defined by the following equation.

$$(xPb+(mvLX[0]>>2)+nPbSw-1)/CtbSizeY-xCurr/CtbSizeY<=yCurr/CtbSizeY-(yPb+(mvLX[1]>>2)+nPbSh-1)/CtbSizeY$$

Figure 11:
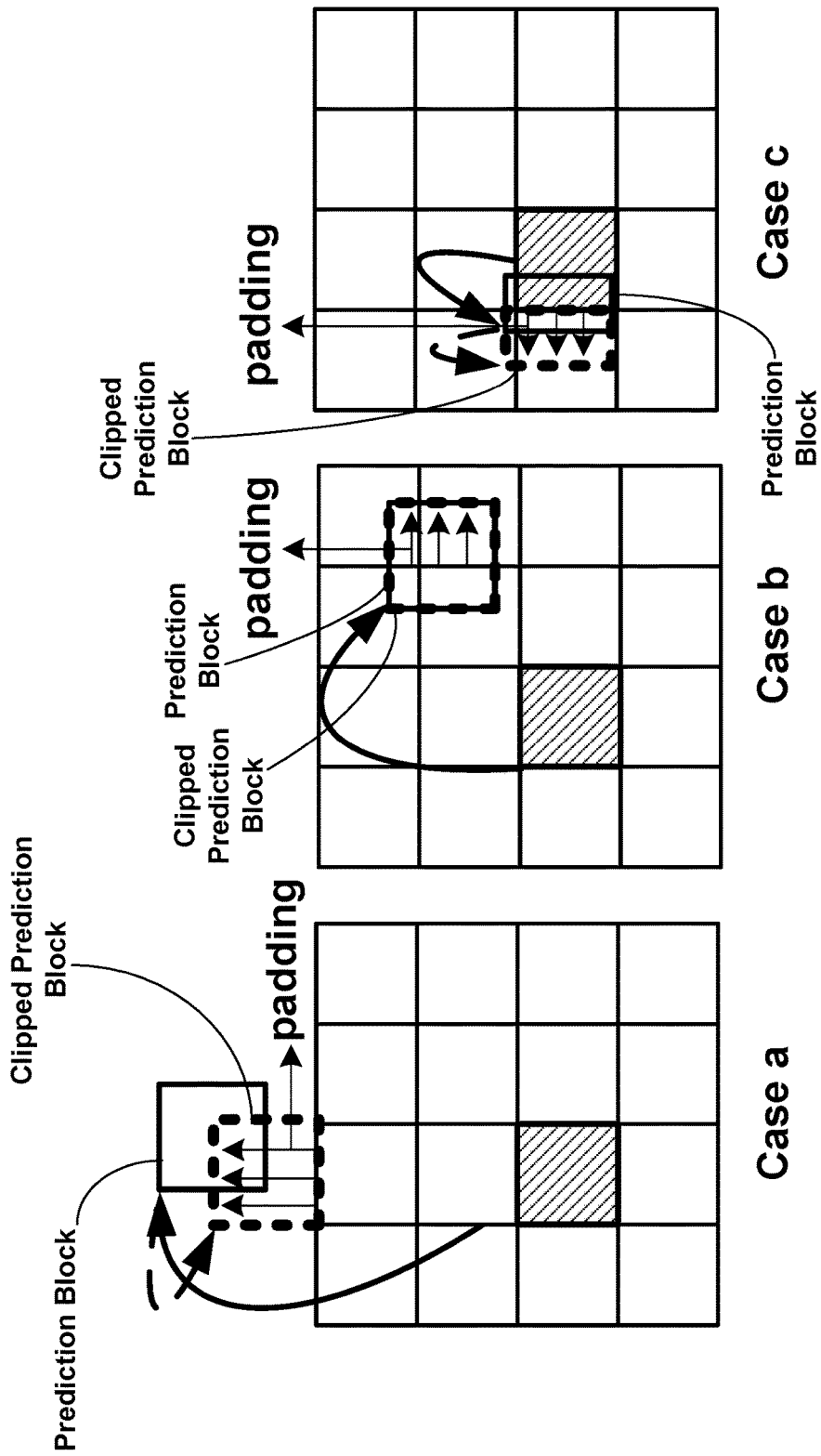
FIG. 11 illustrates additional example scenarios of a clipping operation, in accordance with one or more techniques of this disclosure.

FIG. 11 illustrates some examples scenarios of the above clipping operation. In the scenarios/cases of FIG. 11, the prediction blocks are shown with a solid border and the clipped prediction blocks are shown with a dashed border. As shown in FIG. 11, it may be observed that a particular prediction sample is clipped to valid reference regions and padding may be necessary in some scenarios.

In this example, let the positions $(xA_{i,j}, yA_{i,j})$ represent luma reference samples at full-sample locations inside the given two-dimensional array when $refPicLX_{L=CurrPic}$ of luma samples.

$$yA_{i,j}=\text{Clip3}(\text{samples}_{Inter},(CtbY_{curr}+1)<<Ctb\ Log\ 2SizeY-\text{samples}_{Inter}, yInt_L+j)$$

When $CtbY_{curr},CtbY_{Pred}\&\&\ CtbX_{curr}>=CtbX_{Pred}$ (that is in same CTU row)

$$xA_{i,j}=\text{Clip3}(\text{samples}_{Inter},(xA_{i,j}-(nPbW<<1)-xB1-1-\text{samples}_{Inter}, xInt_L+i)$$

Otherwise, $$xA_{i,j}=\text{Clip3}(\text{samples}_{Inter},((CtbY_{curr}-CtbY_{Pred}+1))<<Ctb\ Log\ 2SizeY)+xCurr_{ctb}-nPbW-xB1-1-\text{samples}_{Inter}, xInt_L)$$

In the above equations, nPbW and nPbH respectively specify the width and the height of the luma prediction block, $CtbY_{Curr}=yCurr>>Ctb\ Log\ 2SizeY$, $CtbY_{Pred}=(yA_{i,j})>>Ctb\ Log\ 2SizeY$, $CtbX_{curr}=xCurr>>Ctb\ Log\ 2SizeY$, $xCurr_{ctb}=(CtbX_{curr})<<Ctb\ Log\ 2SizeY$, xB1 is the luma location of the top-left sample of the current luma prediction block relative to the top-left sample of the current luma coding block, and $\text{samples}_{Inter}$ corresponds to maximum interpolations samples required for luma or chroma samples.

A previous Working Draft (WD) of the SCC Specification, hereinafter referred to as "SCC WD 3", is available from http://phenix.it-sudparis.eu/jct/doc_end_user/documents/22_Geneva/wg11/JCTVC-T1005-v2.zip. In SCC WD 3, the Luma and chroma motion vectors are scaled (<<2) and clipped just before motion compensation when use_integer_mv_flag is equal to 1.

This is specified in SCC WD 3 as indicated below:

When use_integer_mv_flag is equal to 1 and the reference index refIdxLX is not equal to currPic, mvLX and mvCLX (where X equals to 0 or 1) are modified as follows:

$$mvLX=\text{Clip3}(-2^{15},2^{15}-1,mvLX<<2) \quad (8\text{-}203)$$

$$mvCLX=\text{Clip3}(-2^{15},2^{15}-1,mvCLX<<2) \quad (8\text{-}204)$$

In some examples, clipping the scaled motion vectors (luma and chroma) to $2^{15}$-1 may result in the need to perform interpolation. The interpolation may not be required for any other cases. This special case may add unnecessary complexity for the video decoder, which may be undesirable.

In accordance with one or more techniques of this disclosure, a video coder may clip the motion vectors to the nearest value that does not result in interpolation.

When use_integer_mv_flag is equal to 1 and the reference index refIdxLX is not equal to currPic, mvLX and mvCLX (where X equals to 0 or 1) are modified as shown below (additions to SCC WD are shown with underline and deletions to SCC WD 3 are shown with italics):

$$mvLX=\text{Clip3}(-2^{15},2^{15}14,mvLX<<2) \quad (8\text{-}203)$$

$$mvCLX=\text{Clip3}(-2^{15},2^{15}-14,mvCLX<<2) \quad (8\text{-}204)$$

In some examples, the proposed modification may be applied only to luma motion vectors (mvLX). In some examples, the proposed modification may be applied only to chroma motion vectors (mvCLX). In some examples, the proposed modification may be applied to both luma motion vectors (mvLX) and chroma motion vectors (mvCLX).

In some examples, a video decoder may perform the proposed modification based on the value of a syntax element (e.g., chroma_format_idc) that indicates the sampling ratio, such as chroma_format_idc. For example, a video coder may perform the proposed modification is only for 4:4:4 sampling ratios.

Figure 12:
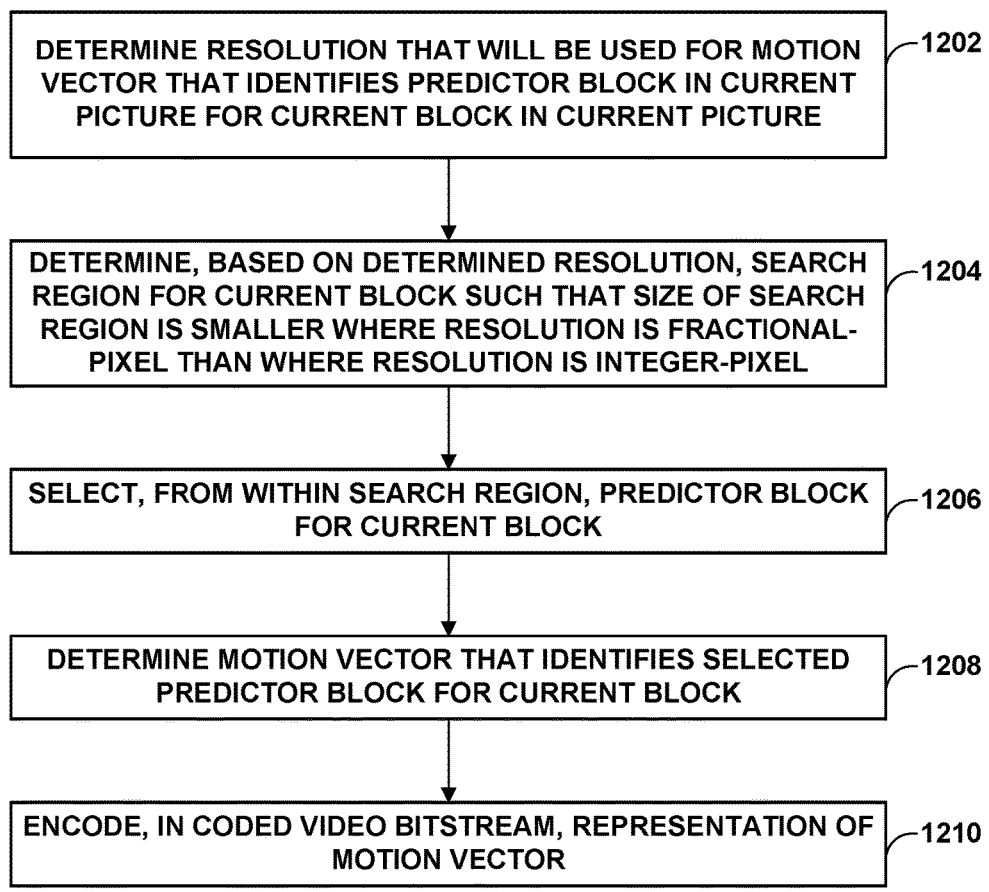
FIG. 12 is a flowchart illustrating an example process for determining a search region for a block of video data, in accordance with one or more techniques of this disclosure.

FIG. 12 is a flowchart illustrating an example process for determining a search region for a block of video data, in accordance with one or more techniques of this disclosure. The techniques of FIG. 12 may be performed by a video encoder, such as video encoder 20 illustrated in FIG. 1 and FIG. 3. For purposes of illustration, the techniques of FIG. 12 are described within the context of video encoder 20 of FIG. 1 and FIG. 3, although video encoders having configurations different than that of video encoder 20 may perform the techniques of FIG. 12.

In accordance with one or more techniques of this disclosure, one or more processors of video encoder 20 may determine a resolution (e.g., integer or fractional) that will be used for a motion vector that identifies a predictor block in a current picture of video data for a current block in the current picture of video data (1202). For instance, motion estimation unit 44 of video encoder 20 may determine whether a chroma motion vector that identifies a chroma predictor block in the current picture will have integer-pixel resolution or fractional-pixel resolution. In some examples, motion estimation unit 44 may determine that fractional-pixel resolution, such as quarter-pixel resolution, will be used for the motion vector where a ratio of chroma sampling relative to luma sampling for the current block is greater than one. In some examples, motion estimation unit 44 may determine that the ratio of chroma sampling relative to luma sampling for the current block is greater than one where a format of current block is 4:2:2 or 4:2:0. In some examples, motion estimation unit 44 may cause entropy encoding unit 56 to encode a syntax element that indicates the resolution that will be used for the motion vector. For instance, motion estimation unit 44 may cause entropy encoding unit 56 to encode a use_integer_mv_flag to indicate whether the motion vector will have integer-pixel resolution or fractional-pixel resolution.

One or more processors of video encoder 20 may determine, based on the determined resolution, a search region for the current block such that a size of the search region is smaller where the resolution is fractional-pixel than a size of the search region where the resolution is integer-pixel (1204). For example, motion estimation unit 44 may determine an initial search region that, in some examples, may include a reconstructed region of the current picture. For instance, motion estimation unit 44 may determine initial search region 802 for current block 800 of FIG. 8. Where the resolution that will be used for the motion vector is integer-pixel, motion estimation unit 44 may determine that the initial search region is the search region for the current block. However, where the resolution that will be used for the motion vector is fractional-pixel, motion estimation unit 44 may determine the search region by at least reducing the initial search region by M samples from right and bottom boundaries of the initial search region, and/or reducing the initial search region by N samples from top and left boundaries of the initial search region. For instance, motion estimation unit 44 may reduce initial search region 802 by M samples from right and bottom boundaries (e.g., distance 808), and reduce initial search region 802 by N samples from top and left boundaries (e.g., distance 806) to generate reduced search region 804 for current block 800 of FIG. 8.

One or more processors of video encoder 20 may select, from within the search region, a predictor block for the current block (1206). As one example, where the resolution that will be used for the motion vector is integer-pixel, motion estimation unit 44 may select a predictor block for the current block from the initial search region (e.g., initial search region 802 of FIG. 8). As another example, where the resolution that will be used for the motion vector is fractional-pixel, motion estimation unit 44 may select a predictor block for the current block from the reduced search region (e.g., reduced search region 804 of FIG. 8). As discussed above, motion estimation unit 44 may identify several candidate predictor blocks from within the determined search region and select the candidate predictor block that closely matches the current block, in terms of pixel difference, which may be determined by sum of absolute difference (SAD), sum of square difference (SSD), or other difference metrics.

One or more processors of video encoder 20 may determine the motion vector that identifies the selected predictor block for the current block (1208). For instance, in the example of FIG. 5, motion estimation unit 44 may determine vector 106 that represents a displacement between current block 102 and the selected predictor block 104.

One or more processors of video encoder 20 may encode, in a coded video bitstream, a representation of the motion vector (1210). For instance, motion estimation unit 44 may cause entropy encoding unit 56 to encode a representation of the determined motion vector. In some examples, the representation may be a difference (i.e., a motion vector difference (MVD)) between the determined motion vector and a predictor for the determined motion vector. In some examples, motion estimation unit 44 may cause entropy encoding unit 56 to encode a representation a luma motion vector that identifies a predictor block of luma samples for the current block and the chroma motion vector may be derivable from the luma motion vector (e.g., based on the a ratio of chroma sampling relative to luma sampling for the current block).

In some examples, such as where the motion vector has fractional-pixel resolution, video encoder 20 may determine, using fractional-pixel interpolation and based at least in part on sample pixel values from outside of the predictor block, pixel values of the predictor block. For instance, where the motion vector is a chroma motion vector that has fractional-pixel resolution, motion compensation unit 46 may perform fractional-pixel interpolation to construct sample pixel values of the predictor block based at least in part on sample pixel values outside the predictor block but within the initial search region.

Video encoder 20 may reconstruct the current block based on the pixel values of the predictor block. For instance, video encoder 20 may add the pixel values of the predictor block to residual values to reconstruct the pixel values of the current block.

Figure 13:
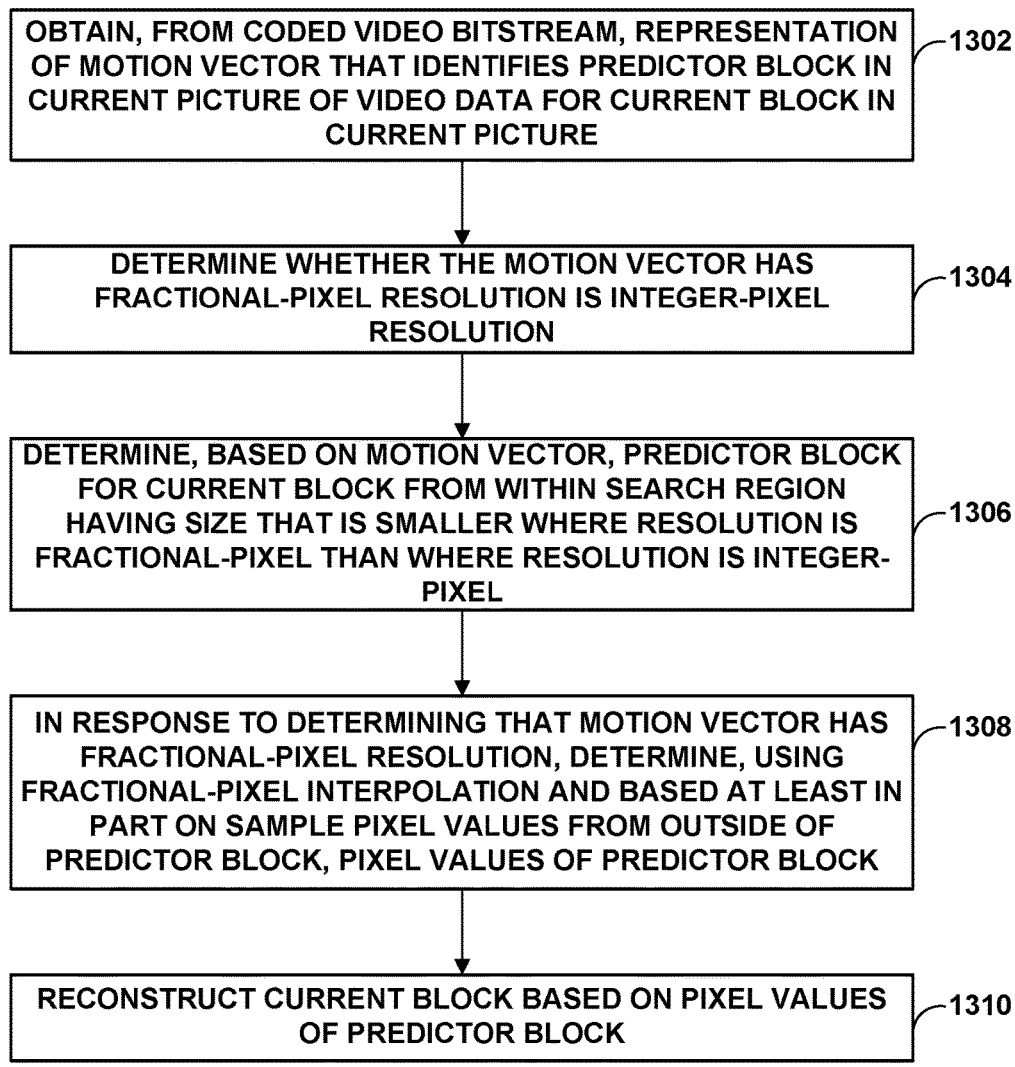
FIG. 13 is a flowchart illustrating an example process for decoding a block of video data, in accordance with one or more techniques of this disclosure.

FIG. 13 is a flowchart illustrating an example process for decoding a block of video data, in accordance with one or more techniques of this disclosure. The techniques of FIG. 13 may be performed by a video decoder, such as video decoder 30 illustrated in FIG. 1 and FIG. 4. For purposes of illustration, the techniques of FIG. 13 are described within the context of video decoder 30 of FIG. 1 and FIG. 4, although video decoders having configurations different than that of video decoder 30 may perform the techniques of FIG. 13.

In accordance with one or more techniques of this disclosure, one or more processors of video decoder 30 may obtain, from a coded video bitstream, a representation of a motion vector that identifies a predictor block in a current picture of video data for a current block in the current picture of video data (1302). For instance, motion compensation unit 72 of video decoder 30 may receive, from entropy decoding unit 70, a representation of a motion vector. In some examples, the representation may be a difference (i.e., a motion vector difference (MVD)) between the determined motion vector and a predictor for the determined motion vector. In some examples, the motion vector may be a luma motion vector that identifies a predictor block of luma samples for the current block and motion compensation unit 72 may derive a chroma motion vector that identifies a predictor block of chroma samples for the current block from the luma motion vector (e.g., based on the a ratio of chroma sampling relative to luma sampling for the current block).

One or more processors of video decoder 30 may determine whether the motion vector has fractional-pixel resolution or integer-pixel resolution (1304). For instance, motion compensation unit 72 may determine that fractional-pixel resolution will be used for the motion vector where a ratio of chroma sampling relative to luma sampling for the current block is greater than one. In some examples, motion compensation unit 72 may determine that the ratio of chroma sampling relative to luma sampling for the current block is greater than one where a format of current block is 4:2:2 or 4:2:0. In some examples, motion compensation unit 72 may receive, from entropy decoding unit 70, a syntax element that indicates the resolution that will be used for the motion vector. For instance, motion compensation unit 72 may receive a use_integer_mv_flag that indicates whether the motion vector will have integer-pixel resolution or fractional-pixel resolution.

One or more processors of video decoder 30 may determine, based on the motion vector, a predictor block for the current block from within a search region having a size that is smaller where the resolution is fractional-pixel than where the resolution is integer-pixel (1306). For example, where the resolution is integer-pixel, the search region for the current block may be an initial search region that, in some examples, may include a reconstructed region of the current picture. For instance, where the resolution is integer-pixel, the search region for the current block may be initial search region 802 for current block 800 of FIG. 8. As another example, where the resolution that will be used for the motion vector is fractional-pixel, the search region for the current block may be a reduced search region determined by reducing the initial search region by M samples from right and bottom boundaries of the initial search region, and reducing the initial search region by N samples from top and left boundaries of the initial search region. For instance, where the resolution is integer-pixel, the search region for the current block may be reduced search region 804 for current block 800 of FIG. 8.

One or more processors of video decoder 30 may, in response to determining that the motion vector has fractional-pixel resolution, determine, using fractional-pixel interpolation and based at least in part on sample pixel values from outside of the predictor block, pixel values of the predictor block (1308). For instance, motion compensation unit 72 may perform fractional-pixel interpolation to determine the pixel values of the predictor block based at least in part on sample pixel values from outside of the initial search region but within the reduced search region (e.g., pixel values included in initial search region 802 but not included in reduced search region 804 of FIG. 8).

One or more processors of video decoder 30 may reconstruct the current block based on the pixel values of the predictor block (1310). For instance, summer 80 of video decoder 30 may add the pixel values of the predictor block to residual values to reconstruct the pixel values of the current block.

The following numbered clauses may illustrate one or more techniques of the disclosure:

Clause 1. A method of encoding or decoding video data, the method comprising: determining an Intra Block Copy (Intra BC) search region for a current block of a current picture of video data based on a resolution of a motion vector that identifies a predictor block for the current block.

Clause 2. The method of clause 1, further comprising: determining the search region with a smaller size where the resolution of the motion vector is fractional-pixel than when the resolution of the motion vector is integer-pixel.

Clause 3. The method of any combination of clauses 1-2, wherein a difference between the size of the search region determined when the resolution of the motion vector is fractional-pixel and the search region determined when the resolution of the motion vector is integer-pixel is based on a number of filter taps used for interpolation of samples in the predictor block.

Clause 4. The method of any combination of clauses 1-3, wherein the search region determined when the resolution of the motion vector is fractional-pixel is smaller than the search region determined when the resolution of the motion vector is integer-pixel in a horizontal direction.

Clause 5. The method of any combination of clauses 1-4, wherein the search region determined when the resolution of the motion vector is fractional-pixel is smaller than the search region determined when the resolution of the motion vector is integer-pixel in a horizontal direction where a format of the current block is 4:2:2.

Clause 6. The method of any combination of clauses 1-5, wherein the search region determined when the resolution of the motion vector is fractional-pixel is smaller than the search region determined when the resolution of the motion vector is integer-pixel in a horizontal direction and a vertical direction.

Clause 7. A method of encoding or decoding video data, the method comprising: coding, by a video coder, a syntax element that indicates a calculation method for a vector that identifies a predictor block for a current block of video data based on a predictor vector and a difference vector; determining, by the video coder, the vector using the indicated calculation method; and storing, by the video coder, the vector.

Clause 8. The method of clause 7, wherein the vector is either a block vector (BV) or a motion vector (MV).

Clause 9. The method of any combination of clauses 7-8, wherein the syntax element indicates a resolution at which the motion vector is to be stored, and wherein storing the motion vector comprises storing the motion vector at the indicated resolution.

Clause 10. The method of any combination of clauses 7-9, wherein a first value of the syntax element indicates that the motion vector is stored at fractional pixel resolution and a second value of the syntax element indicates that the motion vector is stored at integer pixel resolution.

Clause 11. The method of any combination of clauses 7-10, wherein the syntax element indicates a resolution at which the difference vector is coded, the method further comprising: coding the difference vector at the indicated resolution.

Clause 12. The method of clause 11, wherein a first value of the syntax element indicates that the difference vector is coded at fractional pixel resolution and a second value of the syntax element indicates that the difference vector is coded at integer pixel resolution.

Clause 13. The method of any combination of clauses 7-12, wherein the syntax element indicates whether the motion vector is scaled to perform motion compensation, the method further comprising: in response to the syntax element indicating that the motion vector is scaled to perform motion compensation, scaling the motion vector to generate a scaled motion vector; and performing motion compensation using the scaled motion vector.

Clause 14. The method of any combination of clauses 7-13, wherein the calculation method indicated by the syntax element is a first equation where the current block is coded using Intra Block Copy (Intra BC) mode and a second where the current block is coded using intra mode.

Clause 15. The method of any combination of clauses 7-14, wherein the first equation is the same as the second equation.

Clause 16. The method of any combination of clauses 7-15, wherein, in addition to the calculation method for the motion vector, the syntax element indicates one or more of: a resolution at which the motion vector is to be stored; whether the motion vector is scaled to perform motion compensation; and a resolution at which the difference vector is coded.

Clause 17. A method of encoding or decoding a current video block within a current picture based on intra-block copy prediction, the method comprising: in response to determining that a predictor block for the current video block includes at least one pixel located outside of a valid region of the current picture, clipping the predictor block to generate a clipped predictor block that does not include the at least one pixel located outside of the valid region; and encoding or decoding the current video block based on the clipped predictor block.

Clause 18. The method of clause 17, wherein the at least one pixel located outside of the valid region is located outside of a boundary of the current picture.

Clause 19. The method of any combination of clauses 17-18, wherein the at least one pixel located outside of the valid region is located outside of a parallel processing sample boundary.

Clause 20. The method of any combination of clauses 17-19, wherein the at least one pixel located outside of the valid region is located inside the current video block.

Clause 21. The method of any combination of clauses 17-20, wherein the predictor block is identified by a block vector, and wherein clipping the predictor block comprises clipping the block vector.

Clause 22. The method of any combination of clauses 17-21, wherein the clipped predictor block is the same size as the predictor block.

Clause 23. A method of encoding or decoding a current video block within a current picture based on intra-block copy prediction, the method comprising: identifying an unavailable pixel of a predictor block for the current video block, wherein the unavailable pixel is located outside of a reconstructed region of the current picture; performing padding to obtain a value for the unavailable pixel; and encoding or decoding the current video block based on a version of the predictor block that includes the obtained value for the unavailable pixel.

Clause 24. The method of clause, wherein performing the padding comprises: obtaining the value for the unavailable pixel based on a bitdepth of pixel values of the current video block.

Clause 25. The method of any combination of clauses 23-24, wherein the value for the unavailable pixel is obtained in accordance with the following equation: $P_{unavailable}=1<<(BitDepth-1)$, where $P_{unavailable}$ is the obtained value for the unavailable pixel, and BitDepth is the bitdepth of pixel values of the current video block.

Clause 26. A method of encoding or decoding a current video block within a current picture based on intra-block copy prediction, the method comprising: in response to determining that the predictor block includes at least one pixel located outside of a valid region of the current picture, clipping the predictor block to generate a clipped predictor block that does not include the at least one pixel located outside of the valid region; identifying an unavailable pixel of the clipped predictor block, wherein the unavailable pixel is located outside of a reconstructed region of the current picture; performing padding to obtain a value for the unavailable pixel; and encoding or decoding the current video block based on a version of the clipped predictor block that includes the obtained value for the unavailable pixel.

Clause 27. The method of clause 26, wherein the unavailable pixel is located outside of a slice boundary of a slice that includes the current video block.

Clause 28. The method of any combination of clauses 26-27, wherein the unavailable pixel is located outside of a tile boundary of a tile that includes the current video block.

Clause 29. The method of any combination of clauses 26-28, wherein the unavailable pixel forms part of a block of the current picture that has not yet been decoded.

Clause 30. The method of any combination of clauses 26-29, wherein the at least one pixel located outside of the valid region is located inside the current video block.

Clause 31. The method of any combination of clauses 26-30, wherein the at least one pixel located outside of the valid region is located outside of a boundary of the current picture.

Clause 32. The method of any combination of clauses 26-31, wherein the at least one pixel located outside of the valid region is located outside of a parallel processing sample boundary.

Clause 33. The method of any combination of clauses 26-32, wherein the at least one pixel located outside of the valid region is located inside the current video block.

Clause 34. The method of any combination of clauses 26-33, wherein the predictor block is identified by a block vector, and wherein clipping the predictor block comprises clipping the block vector.

Clause 35. The method of any combination of clauses 26-34, wherein the clipped predictor block is the same size as the predictor block.

Clause 36. A method of encoding or decoding a current video block within a current picture based on intra-block copy prediction, the method comprising: clipping a block vector that identifies a predictor block for the current video block to the nearest value that does not require interpolation.

Clause 37. A method of coding video data using an intra block copy video coding technique, the method comprising: determining an intra block copy search region for identifying reference blocks for a current block of video data; reducing the intra block copy search region by M samples from a right and bottom boundary of the intra block copy search region in the case that a motion vector associated with the current block of video data uses chroma interpolation; reducing the intra block copy search region by N samples from a top and left boundary of the intra block copy search region in the case that the motion vector associated with the current block of video data uses chroma interpolation; and coding the current block of video data using the intra block copy search region.

Clause 38. The method of clause 37, wherein M is 2 and N is 2.

Clause 39. The method of clause 37, wherein M is 2 and N is 1.

Clause 40. The method of clause 37, wherein M is 4 and N is 2.

Clause 41. A method comprising any combination of clauses 1-40.

Certain aspects of this disclosure have been described with respect to the HEVC standard for purposes of illustration. However, the techniques described in this disclosure may be useful for other video coding processes, including other standard or proprietary video coding processes not yet developed, such as the H.266 video coding standard currently in development.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a resolution that will be used for a vector that identifies a predictor block in a current picture of the video data for a current block in the current picture of video data;
   determining, based on the determined resolution, a search region for the current block, wherein determining the search region for the current block comprises:
   where the resolution that will be used for the vector is integer-pixel, using an initial search region as the search region for the current block; and
   where the resolution that will be used for the vector is fractional-pixel, determining the search region comprises:
      reducing the initial search region by M samples from right and bottom boundaries of the initial search region;
      reducing the initial search region by N samples from top and left boundaries of the initial search region; and
      using the reduced initial search region as the search region for the current block;
   selecting, from within the search region, a predictor block for the current block;
   determining the vector that identifies the selected predictor block for the current block; and
   encoding, in an encoded video bitstream, a representation of the vector.

2. The method of claim 1, wherein M is 2 and N is 2.

3. The method of claim 1, wherein the vector is a chroma motion vector with fractional-pixel resolution, and wherein encoding the representation of the vector comprises encoding a luma motion vector from which the chroma motion vector is derivable.

4. The method of claim 1, wherein determining the resolution that will be used for the vector comprises determining a resolution that will be used for a chroma motion vector that identifies a chroma predictor block for the current block, the method further comprising:
   determining that fractional-pixel resolution will be used for the vector where a ratio of chroma sampling relative to luma sampling for the current block is greater than one.

5. The method of claim 4, wherein the ratio of chroma sampling relative to luma sampling for the current block is greater than one where a chroma sampling format of the current block is 4:2:2 or 4:2:0.

6. The method of claim 1, further comprising:
   encoding, in the encoded video bitstream, a syntax element that indicates the resolution that will be used for the vector.

7. The method of claim 1, further comprising:
   where the vector has fractional-pixel resolution, determining, using fractional-pixel interpolation and based at least in part on sample pixel values from outside of the predictor block, pixel values of the predictor block; and
   reconstructing the current block based on the pixel values of the predictor block.

8. A method of decoding video data, the method comprising:
   obtaining, from an encoded video bitstream, a representation of a vector that identifies a predictor block in a current picture of the video data for a current block in the current picture of video data;
   determining whether the vector has fractional-pixel resolution or integer-pixel resolution;
   determining, based on the vector, a predictor block for the current block from within a search region, wherein:
      when the vector has integer-pixel resolution, the search region for the current block comprises an initial search region, and
      when the vector has fractional-pixel resolution, the search region for the current block comprises a reduced search region determined by reducing the initial search region by M samples from right and bottom boundaries of the initial search region, and reducing the initial search region by N samples from top and left boundaries of the initial search region;
   in response to determining that the vector has fractional-pixel resolution, determining, using fractional-pixel interpolation and based at least in part on sample pixel values from outside of the predictor block but within the reduced search region, pixel values of the predictor block; and
   reconstructing the current block based on the pixel values of the predictor block.

9. The method of claim 8, wherein M is 2 and N is 2.

10. The method of claim 8, wherein the vector is a chroma motion vector, and wherein obtaining the representation of the motion vector comprises:
    obtaining, from the encoded video bitstream, a representation of luma motion vector; and
    determining the chroma motion vector based on the luma motion vector.

11. The method of claim 8, wherein the vector is a chroma motion vector, the method further comprising:
    determining that fractional-pixel resolution will be used for the chroma motion vector where a ratio of chroma sampling relative to luma sampling for the current block is greater than one.

12. The method of claim 11, wherein the ratio of chroma sampling relative to luma sampling for the current block is greater than one where a chroma sampling format of current block is 4:2:2 or 4:2:0.

13. The method of claim 8, further comprising:
    decoding, from the encoded video bitstream, a syntax element that indicates whether the vector has fractional-pixel resolution or integer-pixel resolution.

14. A device for encoding video data, the device comprising:
    a memory configured to store a portion of the video data; and
    one or more processors configured to:
       determine a resolution that will be used for a vector that identifies a predictor block in a current picture of video data for a current block in the current picture of video data;

determine, based on the determined resolution, a search region for the current block, wherein:
where the resolution that will be used for the vector is integer-pixel, the one or more processors are configured to use an initial search region as the search region for the current block; and
where the resolution that will be used for the vector is fractional-pixel, the one or more processors are configured to:
reduce the initial search region by M samples from right and bottom boundaries of the initial search region;
reduce the initial search region by N samples from top and left boundaries of the initial search region; and
use the reduced initial search region as the search region for the current block;
select, from within the search region, a predictor block for the current block;
determine the vector that identifies the selected predictor block for the current block; and
encode, in an encoded video bitstream, a representation of the vector.

15. The device of claim 14, wherein M is 2 and N is 2.

16. The device of claim 14, wherein the vector is a chroma motion vector, and wherein, to encode the representation of the motion vector, the one or more processors are configured to encode a luma motion vector from which the chroma motion vector is derivable.

17. The device of claim 14, wherein, to determine the resolution that will be used for the vector, the one or more processors are configured to determine a resolution that will be used for a chroma motion vector that identifies a chroma predictor block for the current block, and wherein the one or more processors are further configured to:
determine that fractional-pixel resolution will be used for the chroma motion vector where a ratio of chroma sampling relative to luma sampling for the current block is greater than one.

18. The device of claim 17, wherein the ratio of chroma sampling relative to luma sampling for the current block is greater than one where a format of current block is 4:2:2 or 4:2:0.

19. The device of claim 14, wherein the one or more processors are further configured to:
encode, in the encoded video bitstream, a syntax element that indicates the resolution that will be used for the vector.

20. The device of claim 14, wherein the one or more processors are further configured to:
where the vector has fractional-pixel resolution, determine, using fractional-pixel interpolation and based at least in part on sample pixel values from outside of the predictor block, pixel values of the predictor block; and
reconstruct the current block based on the pixel values of the predictor block.

21. An apparatus for encoding video data, the apparatus comprising:
means for determining a resolution that will be used for a vector that identifies a predictor block in a current picture of video data for a current block in the current picture of video data;
means for determining, based on the determined resolution, a search region for the current block, wherein:
where the resolution that will be used for the vector is integer-pixel, the means for determining the search region are configured to use an initial search region as the search region for the current block; and
where the resolution that will be used for the vector is fractional-pixel, the means for determining the search region are configured to:
reduce the initial search region by M samples from right and bottom boundaries of the initial search region;
reduce the initial search region by N samples from top and left boundaries of the initial search region; and
use the reduced initial search region as the search region for the current block;
means for selecting, from within the search region, a predictor block for the current block;
means for determining the vector that identifies the selected predictor block for the current block; and
means for encoding, in an encoded video bitstream, a representation of the vector.

22. A computer-readable storage medium storing instructions that, when executed, cause one or more processors of a video encoding device to:
determine a resolution that will be used for a vector that identifies a predictor block in a current picture of video data for a current block in the current picture of video data;
determine, based on the determined resolution, a search region for the current block, wherein:
where the resolution that will be used for the vector is integer-pixel, the instructions cause the one or more processors to use an initial search region as the search region for the current block; and
where the resolution that will be used for the vector is fractional-pixel, the instructions cause the one or more processors to:
reduce the initial search region by M samples from right and bottom boundaries of the initial search region;
reduce the initial search region by N samples from top and left boundaries of the initial search region; and
use the reduced initial search region as the search region for the current block;
select, from within the search region, a predictor block for the current block;
determine the vector that identifies the selected predictor block for the current block; and
encode, in an encoded video bitstream, a representation of the vector.

23. A device for decoding video data, the device comprising:
a memory configured to store a portion of the video data; and
one or more processors configured to:
obtain, from an encoded video bitstream, a representation of a vector that identifies a predictor block in a current picture of the video data for a current block in the current picture of video data;
determine whether the vector has fractional-pixel resolution or integer-pixel resolution;
determine, based on the vector, a predictor block for the current block from within a search region, wherein:
when the vector has integer-pixel resolution, the search region for the current block comprises an initial search region, and
when the vector has fractional-pixel resolution, the search region for the current block comprises a reduced search region determined by reducing the initial search region by M samples from right and bottom boundaries of the initial search region, and reducing the initial search region by N samples from top and left boundaries of the initial search region;

in response to determining that the vector has fractional-pixel resolution, determine, using fractional-pixel interpolation and based at least in part on sample pixel values from outside of the predictor block but within the reduced search region, pixel values of the predictor block; and reconstruct the current block based on the pixel values of the predictor block.

24. The device of claim 23, wherein M is 2 and N is 2.

25. The device of claim 23, wherein the vector is a chroma motion vector, and wherein, to obtain the representation of the chroma motion vector, the one or more processors are configured to:

obtain, from the encoded video bitstream, a representation of luma motion vector; and determine the chroma motion vector based on the luma motion vector.

26. The device of claim 23, wherein the vector is a chroma motion vector, and wherein the one or more processors are further configured to:

determine that fractional-pixel resolution will be used for the chroma motion vector where a ratio of chroma sampling relative to luma sampling for the current block is greater than one.

27. The device of claim 26, wherein the ratio of chroma sampling relative to luma sampling for the current block is greater than one where a format of current block is 4:2:2 or 4:2:0.

28. The device of claim 23, wherein the one or more processors are further configured to:

decode, from the encoded video bitstream, a syntax element that indicates whether the vector has fractional-pixel resolution or integer-pixel resolution.

29. An apparatus for decoding video data, the apparatus comprising:

means for obtaining, from an encoded video bitstream, a representation of a vector that identifies a predictor block in a current picture of video data for a current block in the current picture of video data;

means for determining whether the vector has fractional-pixel resolution or integer-pixel resolution;

means for determining, based on the vector, a predictor block for the current block from within a search region, wherein:

when the vector has integer-pixel resolution, the search region for the current block comprises an initial search region, and when the vector has fractional-pixel resolution, the search region for the current block comprises a reduced search region determined by reducing the initial search region by M samples from right and bottom boundaries of the initial search region, and reducing the initial search region by N samples from top and left boundaries of the initial search region;

means for in response to determining that the vector has fractional-pixel resolution, determining, using fractional-pixel interpolation and based at least in part on sample pixel values from outside of the predictor block but within the reduced search region, pixel values of the predictor block; and means for reconstructing the current block based on the pixel values of the predictor block.

30. A computer-readable storage medium storing instructions that, when executed, cause one or more processors of a video decoding device to:

obtain, from an encoded video bitstream, a representation of a vector that identifies a predictor block in a current picture of video data for a current block in the current picture of video data;

determine whether the vector has fractional-pixel resolution or integer-pixel resolution;

determine, based on the vector, a predictor block for the current block from within a search region having a size that is smaller where the resolution is fractional-pixel than where the resolution is integer-pixel, wherein:

when the vector has integer-pixel resolution, the search region for the current block comprises an initial search region, and when the vector has fractional-pixel resolution, the search region for the current block comprises a reduced search region determined by reducing the initial search region by M samples from right and bottom boundaries of the initial search region, and reducing the initial search region by N samples from top and left boundaries of the initial search region;

in response to determining that the vector has fractional-pixel resolution, determine, using fractional-pixel interpolation and based at least in part on sample pixel values from outside of the predictor block but within the reduced search region, pixel values of the predictor block; and reconstruct the current block based on the pixel values of the predictor block.

* * * * *